(12) United States Patent
Zhang

(10) Patent No.: US 9,258,178 B2
(45) Date of Patent: Feb. 9, 2016

(54) PILOT SEQUENCE DESIGN FOR LONG RANGE WLAN

(71) Applicant: MARVELL WORLD TRADE LTD., St. Michael (BB)

(72) Inventor: Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 177 days.

(21) Appl. No.: 13/762,085

(22) Filed: Feb. 7, 2013

(65) Prior Publication Data

US 2013/0202001 A1    Aug. 8, 2013

Related U.S. Application Data

(60) Provisional application No. 61/595,897, filed on Feb. 7, 2012, provisional application No. 61/603,702, filed on Feb. 27, 2012, provisional application No. 61/610,704, filed on Mar. 14, 2012.

(51) Int. Cl.
*H04B 7/02* (2006.01)
*H04J 11/00* (2006.01)
*H04L 29/10* (2006.01)
*H04L 27/26* (2006.01)

(52) U.S. Cl.
CPC .............. *H04L 29/10* (2013.01); *H04L 27/261* (2013.01)

(58) Field of Classification Search
USPC .................................................. 370/476, 338
See application file for complete search history.

(56) References Cited

U.S. PATENT DOCUMENTS

| 7,599,332 | B2 | 10/2009 | Zelst et al. | |
|---|---|---|---|---|
| 7,742,390 | B2 | 6/2010 | Mujtaba | |
| 7,742,533 | B2 * | 6/2010 | Aoki et al. | 375/260 |
| 8,144,647 | B2 | 3/2012 | Nabar et al. | |
| 8,155,138 | B2 | 4/2012 | van Nee | |
| 8,289,869 | B2 | 10/2012 | Sawai | |
| 8,331,419 | B2 | 12/2012 | Zhang et al. | |
| 8,332,732 | B2 | 12/2012 | Lakkis | |

(Continued)

FOREIGN PATENT DOCUMENTS

WO    WO-2009/059229 A1    5/2009
WO    WO-2012/122119 A1    9/2012

OTHER PUBLICATIONS

U.S. Pat. No. 8,625,690 B2 (U.S. Appl. No. 61/449,582, filed Mar. 4, 2011).*

(Continued)

*Primary Examiner* — Edan Orgad
*Assistant Examiner* — Sithu Ko

(57) ABSTRACT

In a method for generating a physical layer (PHY) data unit, pilot tone contribution sequence values for a first set of orthogonal frequency division multiplexing (OFDM) symbols and for a second set of OFDM symbols are determined using a pilot mapping function. The first set is to be included in a signal field of the data unit, and the second set is to be included in a data portion of the data unit. The first set and the second set are generated to include pilot tones modulated based on the pilot tone contribution sequence values determined, respectively, for the first set of OFDM symbols and for the second set of OFDM symbols. The signal field is generated to include the first set, and the data portion is generated to include the second set. The data unit is generated to include at least the signal field and the data portion.

18 Claims, 8 Drawing Sheets

(56) References Cited

U.S. PATENT DOCUMENTS

| | | | |
|---|---|---|---|
| 8,526,351 B2 | 9/2013 | Fischer et al. | |
| 8,527,853 B2 | 9/2013 | Lakkis | |
| 8,619,907 B2 | 12/2013 | Mujtaba et al. | |
| 8,625,690 B2 * | 1/2014 | Taghavi Nasrabadi et al. | 375/260 |
| 8,718,169 B2 * | 5/2014 | Van Nee | 375/267 |
| 8,724,720 B2 | 5/2014 | Srinivasa et al. | |
| 8,826,106 B2 | 9/2014 | Zhang et al. | |
| 2009/0196163 A1 | 8/2009 | Du | |
| 2010/0080309 A1 * | 4/2010 | Moffatt et al. | 375/260 |
| 2011/0002219 A1 | 1/2011 | Kim et al. | |
| 2011/0134899 A1 * | 6/2011 | Jones et al. | 370/338 |
| 2012/0195391 A1 | 8/2012 | Zhang et al. | |
| 2012/0201316 A1 | 8/2012 | Zhang et al. | |
| 2012/0294294 A1 | 11/2012 | Zhang | |
| 2012/0300874 A1 | 11/2012 | Zhang | |

OTHER PUBLICATIONS

International Search Report and Written Opinion in PCT/US2013/025170 dated Jun. 12, 2013.

IEEE Std 802.11-2007 (Revision of IEEE Std./ 802.11-1999) "Draft Standard for Information technology—Telecommunications and information exchange between systems—Local and metropolitan area networks—Specific requirements" Part 11: Wireless LAN Medium Access Control (MAC) and Physical Layer (PHY) specifications, *The Institute of Electrical and Electronics Engineers, Inc.*, (Mar. 8, 2007).

Park, "Proposed Specification Framework for TGah", *The Institute of Electrical and Electronics Engineers*, doc. No. IEEE 802.11—yy/xxxxr05, (Jan. 2012).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, Sep. 2011.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

Park, "Proposed Specification Framework for TGah", *The Institute of Electrical and Electronics Engineers*, doc. No. IEEE 802.11-11/1137r6, (Mar. 2012).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

Zhang et al., "11 ac Explicit Sounding and Feedback", *The Institute of Electrical and Electronics Engineers*, doc. No. IEEE 802.11-10/1105r0, (Sep. 2010).

Stacey et al., "Specification Framework for TGac," document No. IEEE 802.11-09/0992r20, *Institute for Electrical and Electronics Engineers*, pp. 1-49, Jan. 18, 2011.

IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, (Jul. 2012).

de Vegt, "Potential Compromise for 802.11ah Use Case Document," Institute of Electrical and Electronics Engineers, doc. No. IEEE 802.11-11/0457r0, (Mar. 2011).

Yu, et al. "Coverage extension for IEEE802.11ah," *The Institute of Electrical and Electronics Engineers*, doc. No. IEEE 802.11-11/0035r1, (Jan. 2011).

Vermani, et al. "Preamble Format for 1 MHz," *The Institute of Electrical and Electronics Engineers*, doc. No. IEEE 802.11-11/1482r2, (Nov. 2011).

Zhang et al., "11ah Data Transmission Flow," *The Institute of Electrical and Electronics Engineers*, doc. No. IEEE 802.11-11/1484r1, (Nov. 2011).

Taghavi et al., "Introductory Submission for TGah", doc. No. IEEE 802.11-11/0062r0, *Institute for Electrical and Electronics Engineers*, pp. 1-5 (Jan. 14, 2011).

Lee et al., "TGaf PHY proposal," *The Institute of Electrical and Electronics Engineers*, doc. No. IEEE 802.11-12/0809r5, pp. 1-43, Jul. 10, 2012.

Park, "Proposed Specification Framework for TGah D9.x", *The Institute of Electrical and Electronics Engineers*, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11-11/1137r11, pp. 1-36 (Sep. 2012).

(56) References Cited

OTHER PUBLICATIONS

Park, "Specification Framework for TGah," *The Institute of Electrical and Electronics Engineers*, doc. No. IEEE 802.11-11/1137r13, pp. 1-58 (Jan. 14, 2013).

Shao, "Channel Selection for 802.11ah," doc.: IEEE 802.11-12/0816r0, pp. 1-11 (Jul. 2012).

Vermani, et al. "Spec Framework Text for PHY Numerology," *The Institute of Electrical and Electronics Engineers*, doc. No. IEEE 802.11-11/1311r0, pp. 1-5 (Sep. 2011).

Zhang et al., "1 MHz Waveform in Wider BW", *The Institute of Electrical and Electronics Engineers*, doc. No. IEEE 802.11-12/0309r1, pp. 1-10 (Mar. 2012).

Zhang et al., "Beamforming Feedback for Single Stream," *The Institute of Electrical and Electronics Engineers*, doc. No. IEEE 802.11-12/1312r0, pp. 1-22 (Nov. 12, 2012).

International Preliminary Report on Patenability in corresponding PCT Application No. PCT/US2013/025170 dated Aug. 12, 2014 (9 pages).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

Chen, "Home Network Basis: Transmission Environments and Wired/Wireless Protocols," *Prentice Hall*, pp. 1-26 (Jul. 2003).

Harada, "Project: IEEE P802.15 Working Group for Wireless Personal Area Network (WPANs)," IEEE 802.15-07-0693-003c, slides 24-33 (May 2007).

Hiertz, et al., "The IEEE 802.11 Universe," *IEEE Communications Magazine*, pp. 62-70, (Jan. 2010).

Mujtaba, S.A. "IEEE P802.11' Wireless LANs, TGn Sync Proposal Technical Specification," *The Institute of Electrical and Electronics Engineers, Inc.*, doc.: IEEE 802.11-04/0889r6, pp. 1-131 (May 2005).

Perahia, et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

van Nee, et al. "The 802.11n MIMO-OFDM Standard for Wireless LAN and Beyond," Wireless Personal Communications, vol. 37, pp. 445-453 (Jun. 2006).

\* cited by examiner

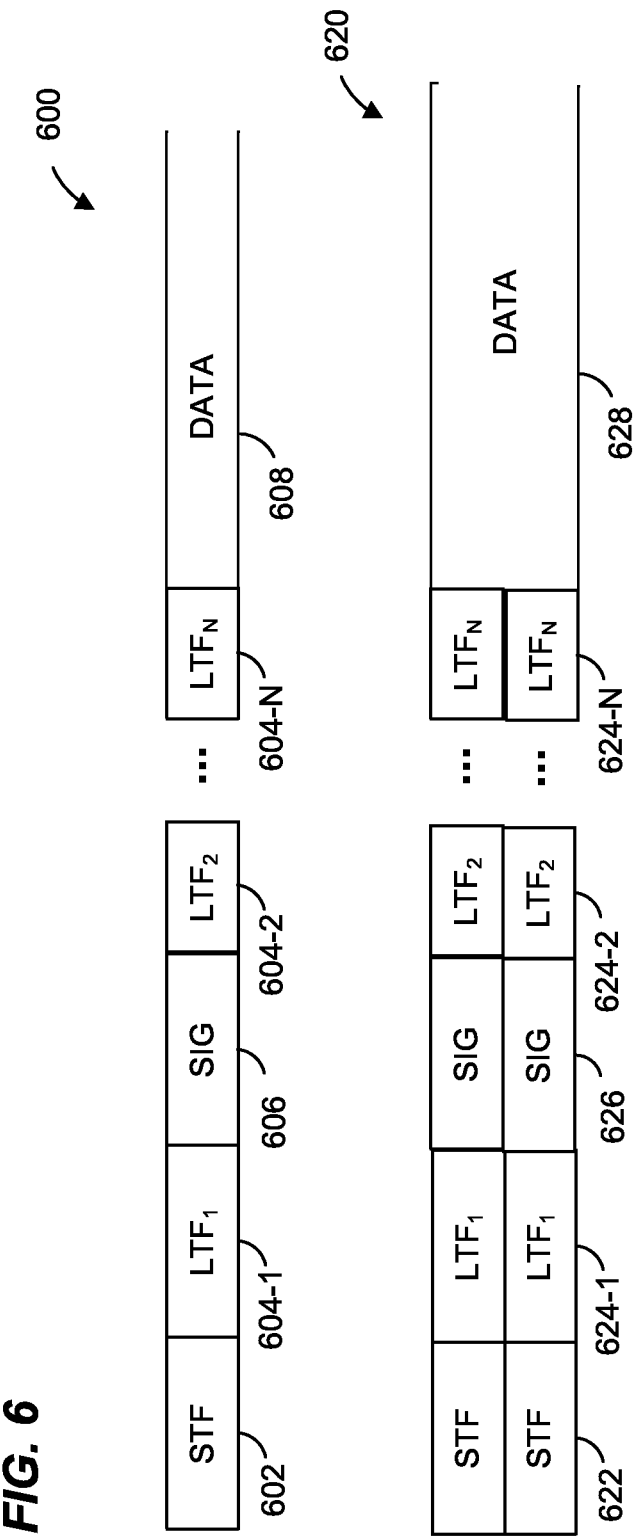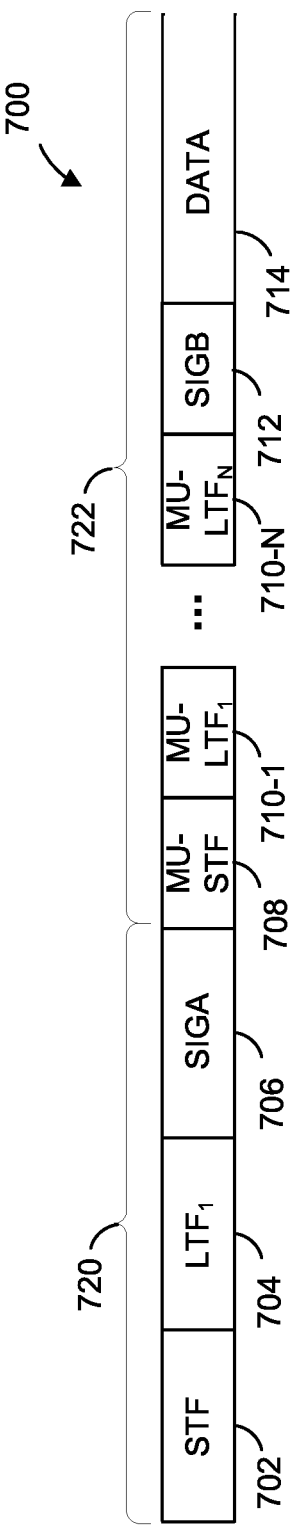

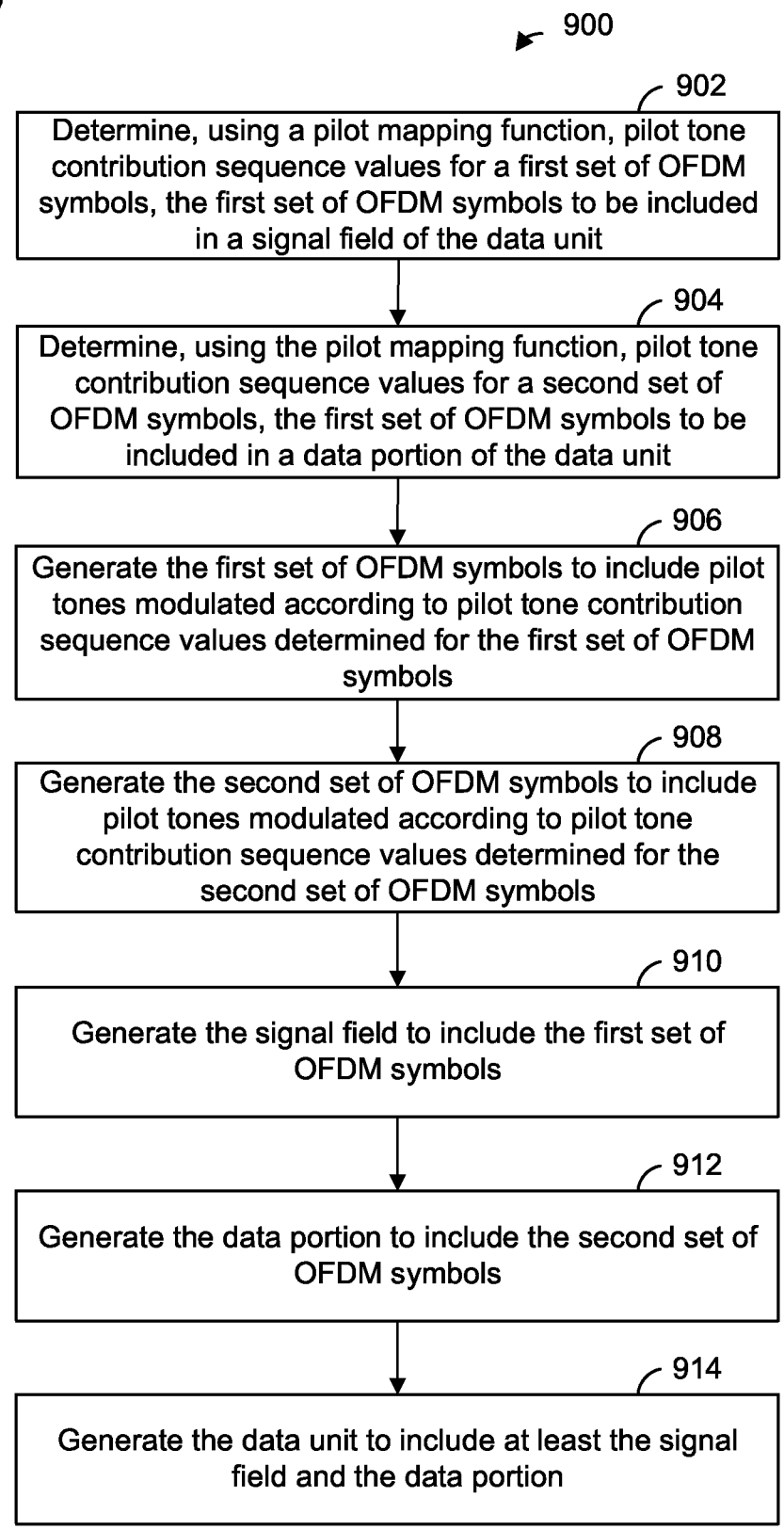

PILOT SEQUENCE DESIGN FOR LONG RANGE WLAN

CROSS-REFERENCES TO RELATED APPLICATIONS

The present application claims the benefit of the following U.S. Provisional Patent Applications:

U.S. Provisional Patent Application No. 61/595,897, entitled "Pilot Sequences," filed on Feb. 7, 2012;

U.S. Provisional Patent Application No. 61/603,702, entitled "Pilot Sequences," filed on Feb. 27, 2012; and U.S. Provisional Patent Application No. 61/610,704, entitled "Pilot Sequences," filed on Mar. 14, 2012.

The disclosures of all of the above-referenced patent applications are hereby incorporated by reference herein in their entireties.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on a two new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In an embodiment, a method for generating a physical layer (PHY) data unit for transmission via a communication channel includes determining, using a pilot mapping function, pilot tone contribution sequence values for a first set of orthogonal frequency division multiplexing (OFDM) symbols, the first set of OFDM symbols to be included in a signal field of the data unit. The method also includes determining, using the pilot mapping function, pilot tone contribution sequence values for a second set of OFDM symbols, the second set of OFDM symbols to be included in a data portion of the data unit. The method further includes generating the first set of OFDM symbols to include pilot tones modulated based on the pilot tone contribution sequence values determined for the first set of OFDM symbols, and generating the second set of OFDM symbols to include pilot tones modulated based on the pilot tone contribution sequence values determined for the second set of OFDM symbols. The method further still includes generating the signal field to include the first set of OFDM symbols, and generating the data portion include the second set of OFDM symbols. The method additionally includes generating the data unit to include at least the signal field and the data portion.

In another embodiment, an apparatus comprises a network interface configured to determine, using a pilot mapping function, pilot tone contribution sequence values for a first set of orthogonal frequency division multiplexing (OFDM) symbols, the first set of OFDM symbols to be included in a signal field of the data unit. The network interface is also configured to determine, using the pilot mapping function, pilot tone contribution sequence values for a second set of OFDM symbols, the second set of OFDM symbols to be included in a data portion of the data unit. The network interface is further configured to generate the first set of OFDM symbols to include pilot tones modulated based on the pilot tone contribution sequence values determined for the first set of OFDM symbols, and generate the second set of OFDM symbols to include pilot tones modulated based on pilot tone contribution sequence values determined for the second set of OFDM symbols. The network interface is further still configured to generate the signal field to include the first set of OFDM symbols, and generate the data portion include the second set of OFDM symbols. The network interface is additionally configured to generate the data unit to include at least the signal field and the data portion.

BRIEF DESCRIPTION OF THE DRAWINGS

FIG. 6 is a diagram of example normal mode data units having different bandwidths, according to an embodiment.

FIG. 7 is a diagram of an example multi-user data unit, according to an embodiment.

FIG. 9 is a flow diagram of an example method for generating a data unit, according to an embodiment.

DETAILED DESCRIPTION

Figure 1:
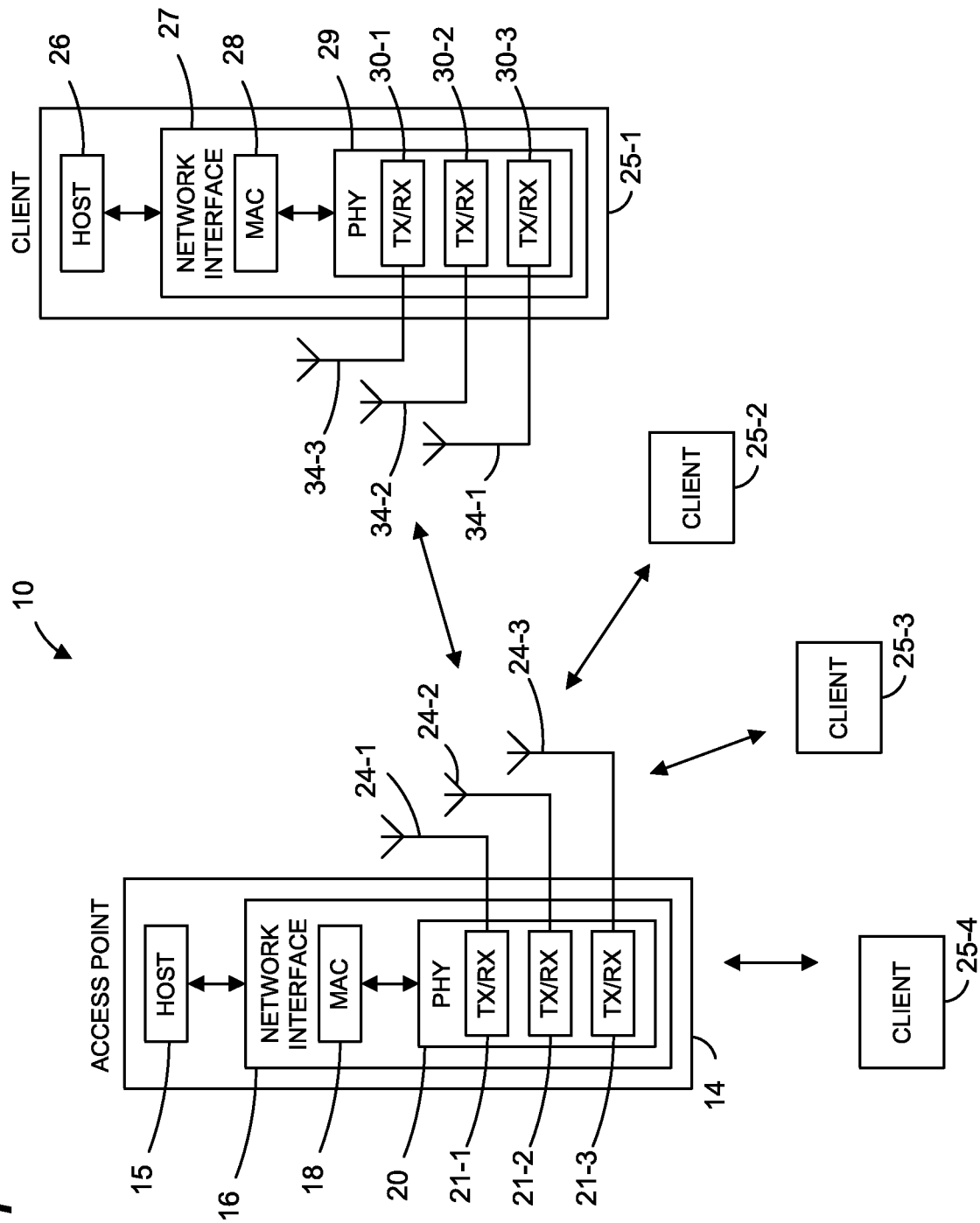
FIG. 1 is a block diagram of an example wireless local area network (WLAN), according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub-1 GHz frequency range, and is typically used for applications requiring long range wireless communication with relatively low data rates. The first communication protocol (e.g., IEEE 802.11af or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g., IEEE 802.11a, IEEE 802.11n, and/or IEEE 802.11ac) are collectively referred to herein as "short range" communication protocols. In some embodiments, physical layer (PHY) data units conforming to the long range communication protocol ("long range data units") are the same as or similar to data units conforming to a short range communication protocol ("short range data units"), but are generated using a lower clock rate. To this end, in an embodiment, the AP operates at a clock rate suitable for short range operation, and down-clocking is used to generate a clock to be used for the sub-1 GHz operation. As a result, in this embodiment, a long range data unit maintains the physical layer format of a short range data unit, but is transmitted over a longer period of time.

In addition to this "normal mode" specified by the long range communication protocol, in some embodiments, the long range communication protocol also specifies a "low bandwidth mode" with a reduced bandwidth and data rate compared to the lowest bandwidth and data rate specified for the normal mode. Because of the lower data rate, the low bandwidth mode further extends communication range and generally improves receiver sensitivity. Data units corresponding to the low bandwidth mode are generated utilizing the same clock rate as data units corresponding to the normal mode (e.g., are down-clocked by the same ratio used for normal mode data units). For example, orthogonal frequency division multiplexing (OFDM) symbols of normal mode and low bandwidth mode data units both have the same subcarrier/tone spacing and OFDM symbol duration, in an embodiment. In some embodiments, the normal mode and/or low bandwidth mode include multiple PHY sub-modes. In one embodiment, for example, the normal mode includes a first sub-mode corresponding to 2 MHz data units, a second sub-mode corresponding to 4 MHz data units, etc., and the low bandwidth mode corresponds to only 1 MHz data units. In another embodiment, the low bandwidth mode likewise includes multiple sub-modes corresponding to data units having different bandwidths (e.g., 1 MHz, 0.5 MHz, etc.).

The function of the low bandwidth mode may depend on the region in which the mode is utilized. For example, in one embodiment of an IEEE 802.11ah system in the United States, where a relatively large amount of spectrum is available in sub-1 GHz frequencies, normal mode communications utilize channels having at least a minimum bandwidth (e.g., 2 MHz, or 2.5 MHz, etc.), and the low bandwidth mode serves as a "control mode" having an even smaller bandwidth (e.g., 1 MHz, or 1.25 MHz, etc.). In an embodiment, the AP uses the control mode for signal beacon or association procedures, and/or for transmit beamforming training operations, for example. As another example, in one embodiment of a communication system in which less spectrum is available in sub-1 GHz frequencies (e.g., Europe or Japan), the low bandwidth mode serves as an extension of the normal mode rather than a control mode.

In various embodiments, one or more OFDM symbols in a data unit include pilot tones generally used for phase tracking and frequency offset corrections in the receiver of the data unit. Pilot tone locations and values used for long range normal mode data units are selected in accordance with a short range communication protocol, in some embodiments. Pilot tone locations and/or values used for long range low bandwidth mode data units, on the other hand, are not selected in accordance with the short range communication protocol, bit are newly designed for the long range communication protocol, in some embodiments.

FIG. 1 is a block diagram of an example WLAN 10 including an AP 14, according to an embodiment. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate at least according to one or more of the short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is also configured to process received data units conforming to the long range communication protocol and having formats described hereinafter, according to various embodiments.

In various embodiments, the PHY processing unit 29 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the long range communication protocol and having formats described hereinafter, according to various embodiments.

In some embodiments, the AP 14 is configured to operate in dual band configurations. In such embodiments, the AP 14 is able to switch between short range and long range modes of operation. According to one such embodiment, when operating in short range mode, the AP 14 transmits and receives data units that conform to one or more of the short range communication protocols. When operating in a long range mode, the AP 14 transmits and receives data units that conform to the long range communication protocol. Similarly, the client station 25-1 is capable of dual frequency band operation, according to some embodiments. In these embodiments, the client station 25-1 is able to switch between short range and long range modes of operation. In other embodiments, the AP 14 and/or the client station 25-1 is dual band device that is able to switch between different low frequency bands defined for long range operations by the long range communication protocol. In yet another embodiment, the AP 14 and/or the client station 25-1 is a single band device configured to operate in only one long range frequency band.

In still other embodiments, the client station 25-1 is a dual mode device capable of operating in different regions with different corresponding PHY modes. For example, in one such embodiment, the client station 25-1 is configured to utilize the normal mode PHY when operating in a first region, and to utilize the low bandwidth mode PHY when operating in a second region (e.g., a region with less available spectrum). In an embodiment, the client station 25-1 can switch between normal and low bandwidth modes in the different regions by switching between low bandwidth mode and normal mode baseband signal processing of the transmitter and receiver, and switching digital and analog filters to meet the requirements applicable to each mode (e.g., spectral mask requirements at the transmitter, adjacent channel interference requirements at the receiver, etc.). Hardware settings such as clock rate, however, are unchanged when switching between low bandwidth mode and normal mode, in an embodiment.

In one example embodiment, client station 25-1 is a dual mode device that utilizes a normal mode PHY in the U.S. (e.g., for 2 MHz and wider channels) and a low bandwidth mode in Europe and/or Japan (e.g., for 1 MHz channels). The same clock rate is used globally, in this embodiment, with different inverse discrete Fourier transform (IDFT) sizes being utilized to generate signals of different bandwidths (e.g., a 64-point or larger IDFT for the 2 MHz or wider bandwidth U.S. channels, and a 32-point IDFT for the 1 MHz Europe/Japan channels). In some of these embodiments, the low bandwidth mode is also used for control PHY in the U.S.

In another example embodiment, client station 25-1 is a dual mode device that in the U.S. utilizes a normal mode PHY (e.g., for 2 MHz and wider channels) and a low bandwidth mode PHY (e.g., for control mode signals having a 1 MHz bandwidth), and in Europe and/or Japan utilizes only the low bandwidth mode PHY (e.g., for 1 MHz channels). The same clock rate is used globally, in this embodiment, with different IDFT sizes being used to generate signals of different bandwidths (e.g., a 64-point or larger IDFT for the 2 MHz or wider bandwidth U.S. channels, and a 32-point IDFT for both the 1 MHz U.S. control mode signals and the 1 MHz Europe/Japan channels).

In some embodiments, devices such as client station 25-1 use the same size IDFT (at a constant clock rate) whether generating a smallest-bandwidth normal mode data unit or a low bandwidth mode data unit. For example, in one embodiment, a 64-point IDFT is used to generate both a 2 MHz normal mode data unit and a 1 MHz low bandwidth mode data unit, with the appropriate tones being zeroed out in the latter case. In some scenarios for these embodiments, filters need not be changed on the fly when changing between PHY modes, while still meeting the spectral mask requirements for the wider (e.g., 2 MHz) channel. In other scenarios, a transmitted low bandwidth mode signal is required to meet a tighter, lower bandwidth spectral mask even if transmitted using an IDFT size corresponding to a wider bandwidth.

Figure 2:
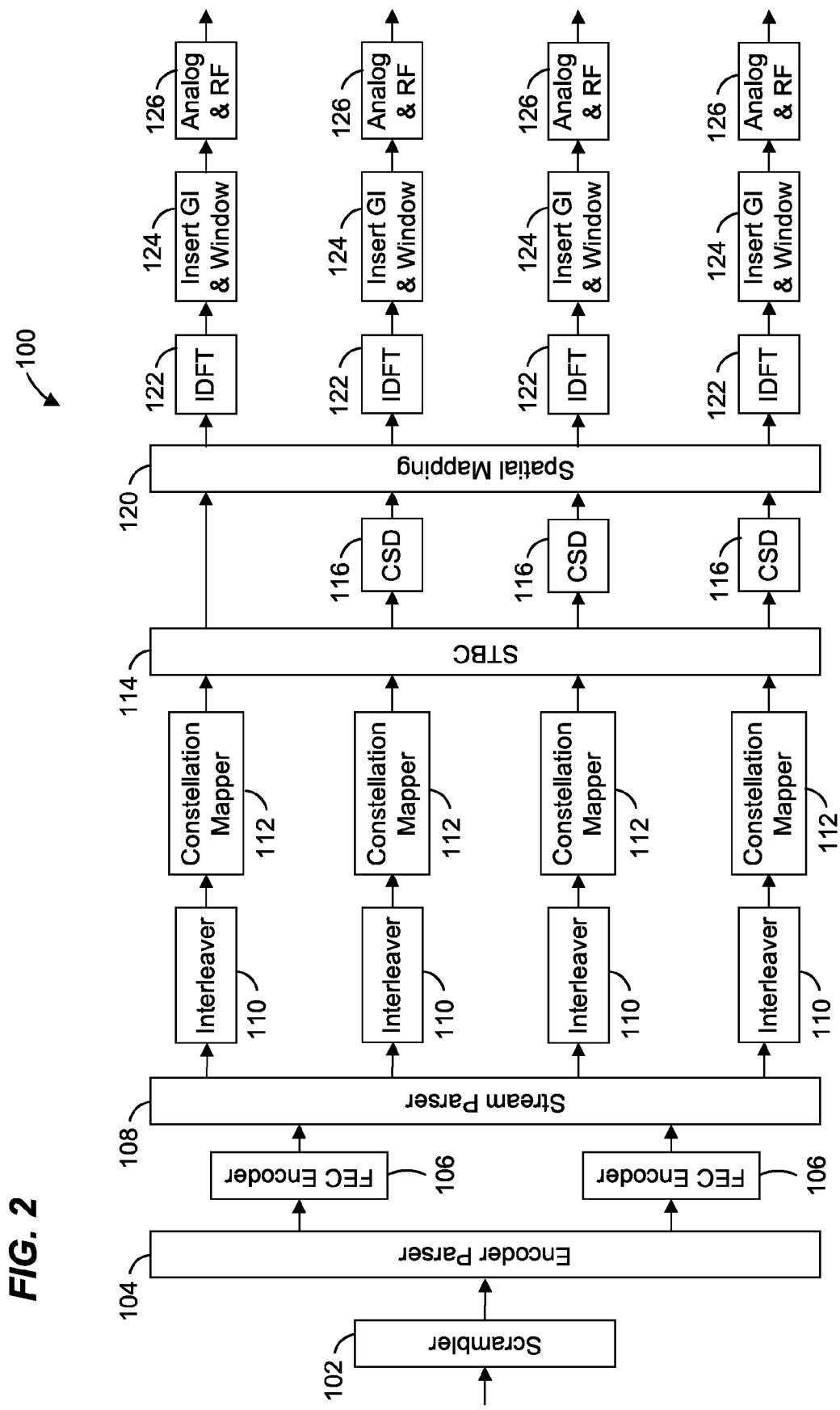
FIG. 2 is a block diagram of a transmit portion of an example PHY processing unit for generating normal mode data units, according to an embodiment.

FIG. 2 is a block diagram of a transmit portion of an example PHY processing unit 100 for generating normal mode data units, according to an embodiment. Referring to FIG. 1, the PHY processing unit 20 of AP 14 and the PHY processing unit 29 of client station 25-1 are each similar to or the same as PHY processing unit 100, in one embodiment. The PHY processing unit 100 includes a scrambler 102 that generally scrambles an information bit stream to reduce occurrences of long sequences of ones or zeros, according to an embodiment. An encoder parser 104 is coupled to the scrambler 102. The encoder parser 208 demultiplexes the information bit stream into one or more encoder input streams corresponding to one or more FEC encoders 106.

While two FEC encoders 106 are shown in FIG. 2, different numbers of FEC encoders are included, and/or different numbers of FEC encoders operate in parallel, in various other embodiments and/or scenarios. For example, according to one embodiment, the PHY processing unit 100 includes four FEC encoders 106, and one, two, three, or four of the FEC encoders 106 operate simultaneously depending on the particular modulation and coding scheme (MCS), bandwidth, and number of spatial streams. Each FEC encoder 106 encodes the corresponding input stream to generate a corresponding encoded stream. In one embodiment, each FEC encoder 106 includes a binary convolutional coder (BCC). In another embodiment, each FEC 106 encoder includes a BCC followed by a puncturing block. In another embodiment, each FEC encoder 106 includes a low density parity check (LDPC) encoder.

A stream parser 108 parses the one or more encoded streams into one or more spatial streams (e.g., four streams in the example PHY processing unit 100 shown in FIG. 2) for separate interleaving and mapping into constellation points/symbols. In one embodiment, the stream parser 108 operates according to the IEEE 802.11n communication protocol, such that the following equation is satisfied:

$$s = \max\left\{1, \frac{N_{BPSCS}}{2}\right\} \quad \text{Equation 1}$$

where s is the number of coded bits assigned to a single axis in a constellation point for each of $N_{SS}$ spatial streams, and where $N_{BPSCS}$ is the number of bits per subcarrier. For each FEC encoder 106 (whether BCC or LDPC), consecutive blocks of s coded bits are assigned to different spatial streams in a round robin fashion, in an embodiment. In some embodiments where the set of FEC encoders 106 includes two or more BCC encoders, the outputs of the individual FEC encoders 106 are used in an alternating fashion for each round-robin cycle, i.e., initially S bits from the first FEC encoder 106 are fed into $N_{SS}$ spatial streams, then S bits from the second FEC encoder 106 are fed into the $N_{SS}$ spatial streams, and so on, where:

$$S = N_{SS} \times s \qquad \text{Equation 2}$$

Corresponding to each of the $N_{SS}$ spatial streams, an interleaver 110 interleaves bits of the spatial stream (i.e., changes the order of the bits) to prevent long sequences of adjacent noisy bits from entering a decoder at the receiver. More specifically, the interleaver 110 maps adjacent coded bits onto non-adjacent locations in the frequency domain or in the time domain. The interleaver 110 operates according to the IEEE 802.11n communication protocol (i.e., two frequency permutations in each data stream, and a third permutation to cyclically shift bits differently on different streams), in an embodiment, with the exception that the parameters $N_{col}$, $N_{row}$, and $N_{rot}$ (i.e., number of columns, number of rows, and frequency rotation parameter, respectively) are suitable values based on the bandwidth of the long range, normal mode data units.

Also corresponding to each spatial stream, a constellation mapper 112 maps an interleaved sequence of bits to constellation points corresponding to different subcarriers/tones of an OFDM symbol. More specifically, for each spatial stream, the constellation mapper 112 translates every bit sequence of length $\log_2(M)$ into one of M constellation points, in an embodiment. The constellation mapper 112 handles different numbers of constellation points depending on the MCS being utilized. In an embodiment, the constellation mapper 112 is a quadrature amplitude modulation (QAM) mapper that handles M=2, 4, 16, 64, 256, and 1024. In other embodiments, the constellation mapper 112 handles different modulation schemes corresponding to M equaling different subsets of at least two values from the set {2, 4, 16, 64, 256, 1024}.

In an embodiment, a space-time block coding (STBC) unit 114 receives the constellation points corresponding to the one or more spatial streams and spreads the spatial streams to a number ($N_{STS}$) of space-time streams. In some embodiments, the STBC unit 114 is omitted. Cyclic shift diversity (CSD) units 116 are coupled to the STBC unit 114. The CSD units 116 insert cyclic shifts into all but one of the space-time streams (if more than one space-time stream) to prevent unintentional beamforming. For ease of explanation, the inputs to the CSD units 116 are referred to as space-time streams even in embodiments in which the STBC unit 114 is omitted.

A spatial mapping unit 120 maps the $N_{STS}$ space-time streams to $N_{TX}$ transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains. Each output of the spatial mapping unit 120 corresponds to a transmit chain, and each output of the spatial mapping unit 120 is operated on by an IDFT calculation unit 122 (e.g., an inverse fast Fourier transform (IFFT) calculation unit) that converts a block of constellation points to a time-domain signal. Outputs of the IDFT units 122 are provided to GI insertion and windowing units 124 that prepend to OFDM symbols, a guard interval (GI) portion, which is a circular extension of an OFDM symbol in an embodiment, and smooth the edges of OFDM symbols to increase spectral delay. Outputs of the GI insertion and windowing units 124 are provided to analog and radio frequency (RF) units 126 that convert the signals to analog signals and upconvert the signals to RF frequencies for transmission. The signals are transmitted in a 2 MHz, a 4 MHz, an 8 MHz, or a 16 MHz bandwidth channel (e.g., corresponding to a 64-, 128-, 256-, or 512-point IDFT at unit 122, respectively, and utilizing a clock rate that is constant regardless of IDFT size), in various embodiments and/or scenarios. In other embodiments, other suitable channel bandwidths (and/or IDFT sizes) are utilized. Long range data units corresponding to the normal mode are discussed in more detail in U.S. patent application Ser. No. 13/359,336, filed on Jan. 6, 2012 and entitled "Physical Layer Frame Format for Long Range WLAN," which is hereby incorporated by reference herein in its entirety.

Low bandwidth mode communications are generally more robust than normal mode communications, having a sensitivity gain that supports extended range communications. For example, in an embodiment in which the normal mode utilizes a 64-point IDFT (e.g., for a 2 MHz bandwidth signal) to generate normal mode data units, and in which the low bandwidth mode utilizes a 32-point IDFT (e.g., for a 1 MHz bandwidth signal) to generate low bandwidth mode data units, the low bandwidth mode provides approximately a 3 dB sensitivity gain. As another example, in an embodiment in which the normal mode utilizes a 64-point IDFT (e.g., for a 2 MHz bandwidth signal) to generate normal mode data units, and in which the low bandwidth mode utilizes a 16-point IDFT (e.g., for a 0.5 MHz bandwidth signal) to generate low bandwidth mode data units, the low bandwidth mode provides approximately a 6 dB sensitivity gain. Moreover, in some embodiments, the low bandwidth mode introduces redundancy or repetition of bits into at least some fields of the data unit to further reduce the data rate. For example, in various embodiments and/or scenarios, the low bandwidth mode introduces redundancy into the data portion and/or the signal field of a low bandwidth mode data unit according to one or more repetition and coding schemes described below. In an embodiment where the low bandwidth mode includes a 2× repetition of bits, for example, a further 3 dB sensitivity gain may be obtained. Still further, in some embodiments, the low bandwidth mode improves sensitivity by generating OFDM symbols in accordance with the lowest data rate MCS of the normal mode, or in accordance with an MCS lower than the lowest data rate MCS of the normal mode. As an example, in an embodiment, data units in normal mode are generated according to a particular MCS selected from a set of MCSs, such as MCS0 (binary phase shift keying (BPSK) modulation and coding rate of ½) to MCS9 (quadrature amplitude modulation (QAM) and coding rate of ⅚), with higher order MCSs corresponding to higher data rates. In one such embodiment, the low bandwidth mode data units are generated using modulation and coding as defined by MCS0. In an alternative embodiment, MCS0 is reserved for low bandwidth mode data units only, and cannot be used for normal mode data units.

Figure 3:
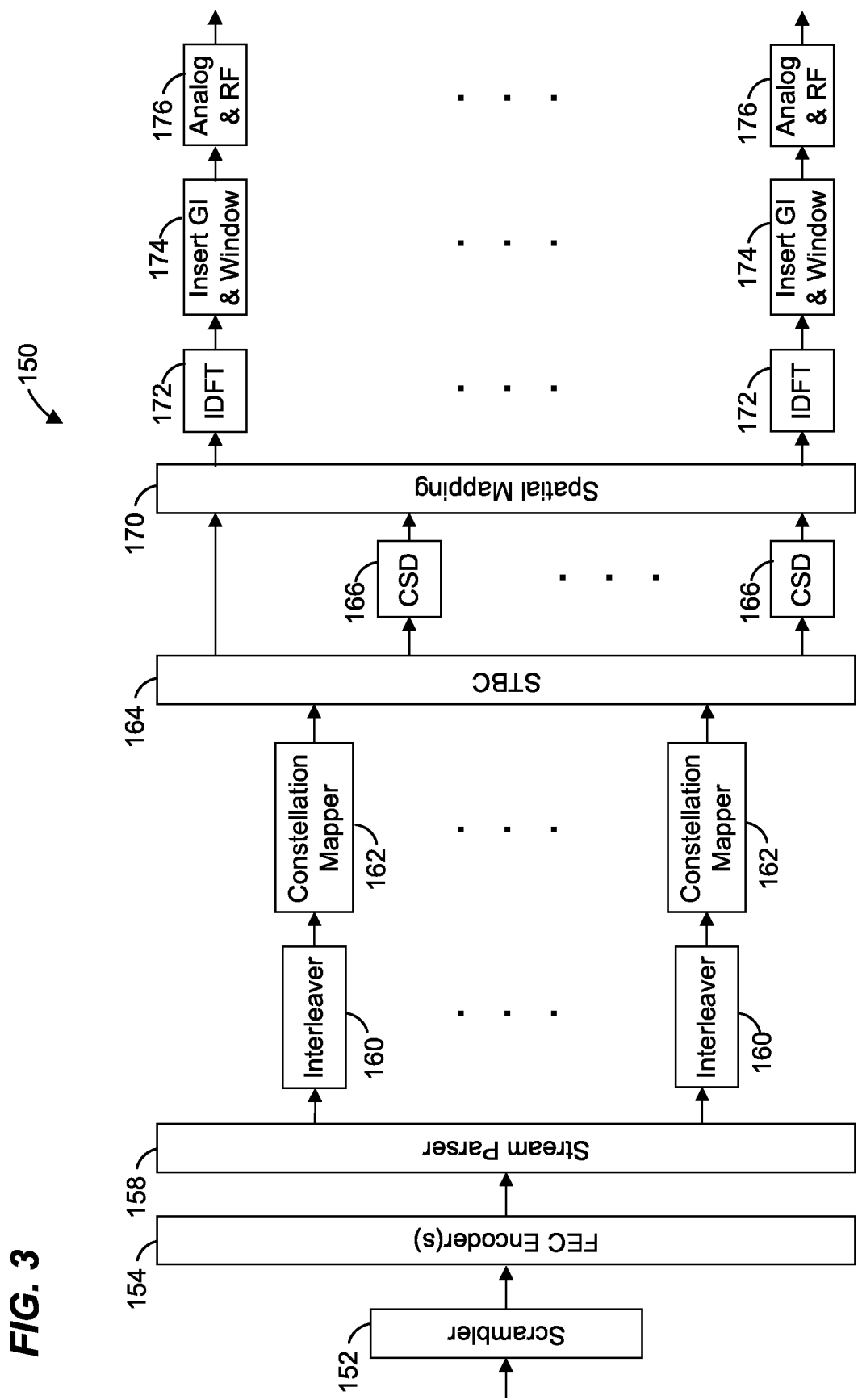
FIG. 3 is a block diagram of a transmit portion of an example PHY processing unit for generating low bandwidth mode data units, according to an embodiment.
Figure 4:
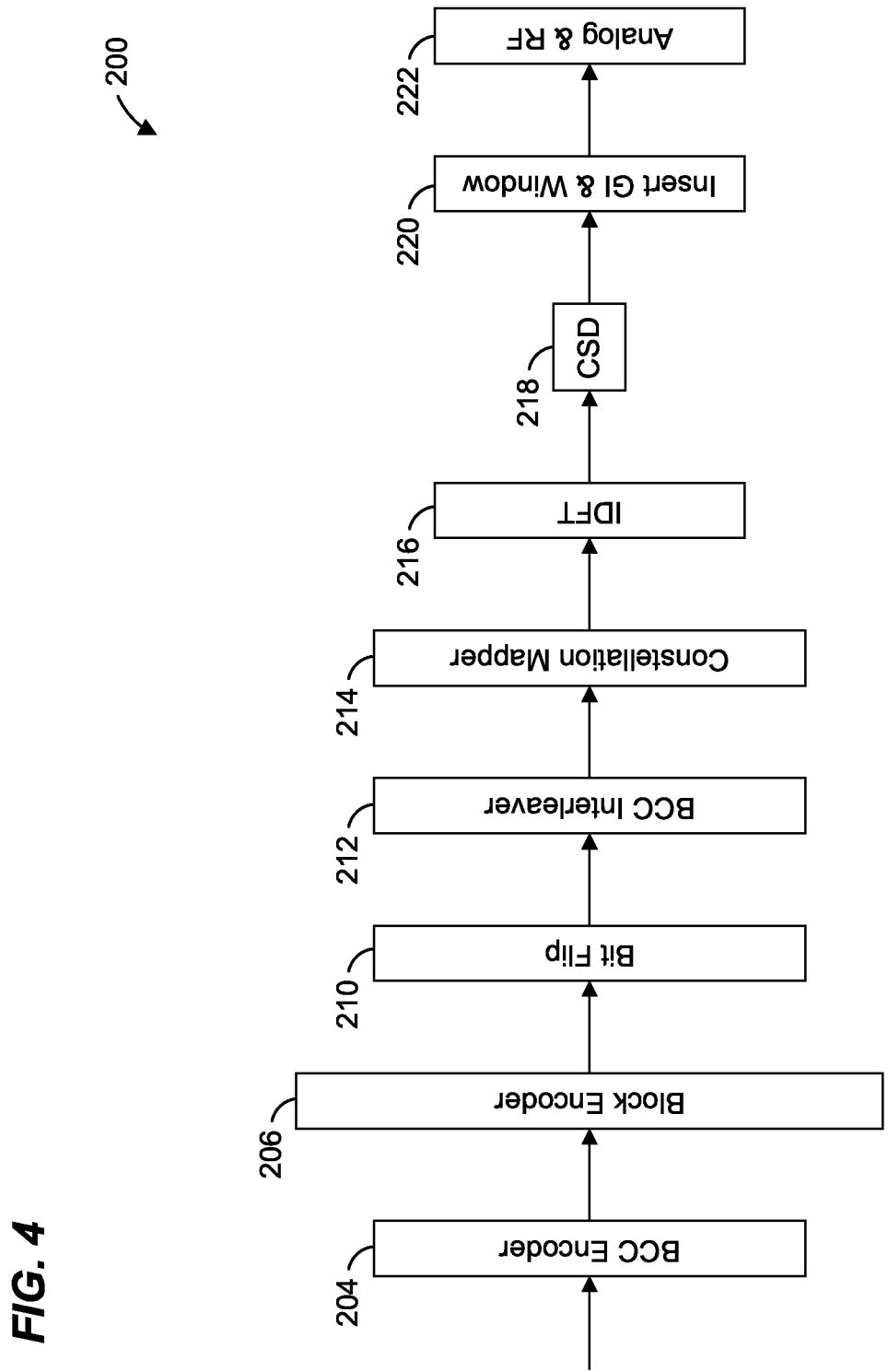
FIG. 4 is a block diagram of a transmit portion of another example PHY processing unit for generating low bandwidth mode data units, according to an embodiment.
Figure 5:
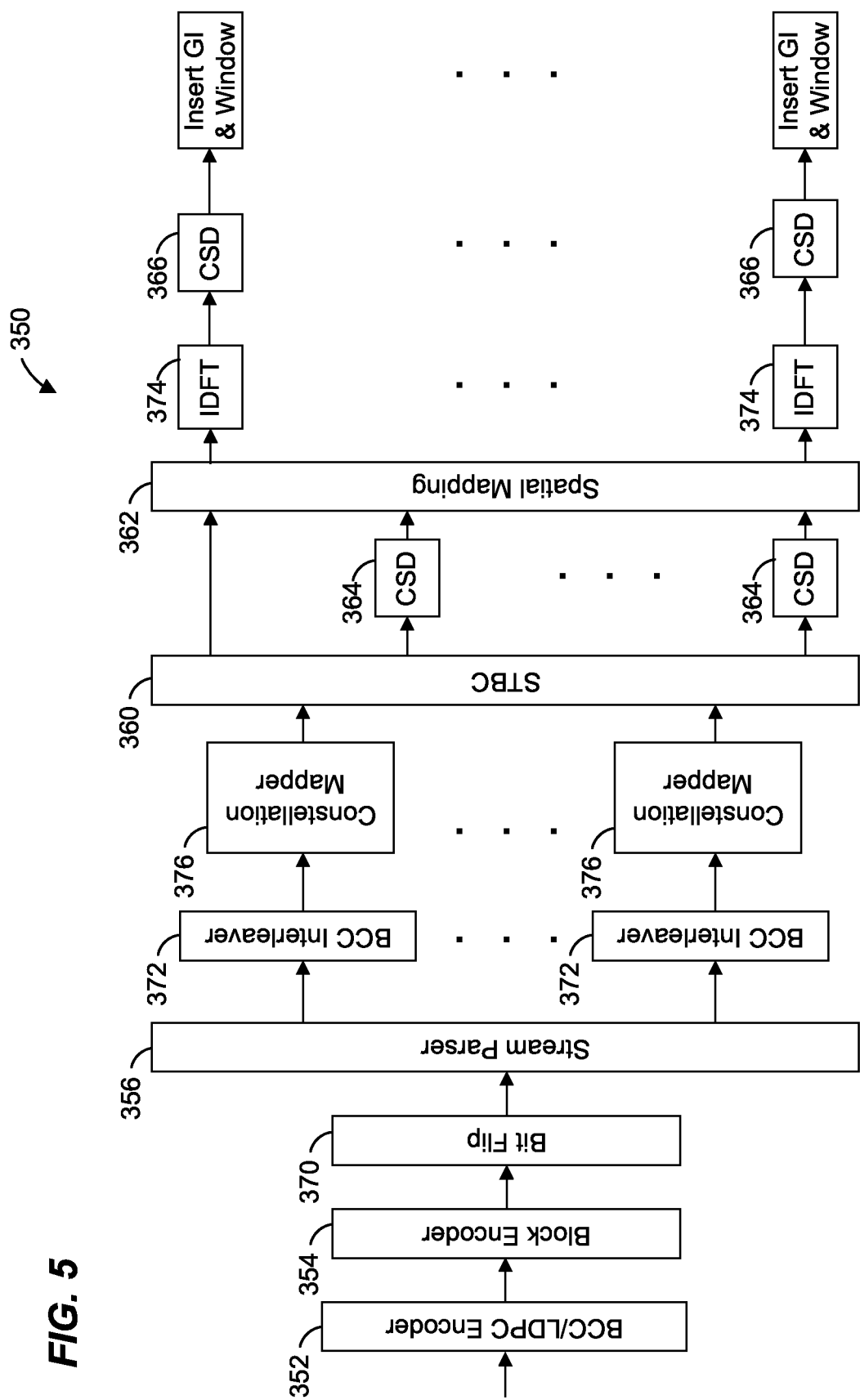
FIG. 5 is a block diagram of a transmit portion of another example PHY processing unit for generating low bandwidth mode data units, according to an embodiment.

FIGS. 3-5 are block diagrams of transmit portions of example PHY processing units for generating low bandwidth mode data units, according to various embodiments. Referring to FIG. 1, the PHY processing unit 20 of AP 14 and the PHY processing unit 29 of client station 25-1 are each similar to or the same as any one of the PHY processing units shown in FIGS. 3-5, in various embodiments. In some embodiments, the PHY processing units of FIGS. 3-5 correspond to the same hardware as the PHY processing unit 100 of FIG. 2, but with different signal processing operations being utilized within the hardware depending on whether normal mode or low bandwidth mode data units are being generated.

The PHY processing unit 150 of FIG. 3 includes a scrambler 152 which is similar to the scrambler 102 of FIG. 2, in an embodiment. The scrambler 152 is coupled to one or more FEC encoders 154, which in an embodiment is/are similar to the FEC encoder 106 of FIG. 2. In an embodiment where the PHY processing unit 150 includes two or more FEC encoders 154, an encoder parser (not shown) similar to encoder parser 104 of FIG. 2 is coupled between the scrambler 152 and FEC encoders 154.

A stream parser 158 is coupled to the output(s) of the FEC encoder(s) 154. The stream parser 158 is similar to the stream parser 108 of FIG. 2 (e.g., Equations 1 and 2, above, are satisfied), in an embodiment, with the exception that the relevant parameters for Equations 1 and 2 above (e.g., $N_{BPSCS}$ and $N_{SS}$) match the low bandwidth mode system parameters (e.g., $N_{SS}$=1 if only one spatial stream is permitted for low bandwidth mode data units). The stream parser 158 is coupled to the interleavers 160. The interleavers 160 are similar to interleavers 110 of FIG. 2, in an embodiment, with the exception that the parameters $N_{col}$, $N_{row}$, and $N_{rot}$ are suitable values based on the bandwidth of the low bandwidth data units. For example, in various embodiments in which the lowest bandwidth normal mode data units are 2 MHz data units generated using 64-point IDFTs, and in which the low bandwidth mode data units are 1 MHz data units generated using 32-point IDFTs and having 24 OFDM data tones, one of the following three options is implemented:

1) $N_{col}=12, N_{row}=2 \times N_{BPSCS}$      Equation 3

2) $N_{col}=8, N_{row}=3 \times N_{BPSCS}$      Equation 4

3) $N_{col}=6, N_{row}=4 \times N_{BPSCS}$      Equation 5 and $N_{rot}$ is one of {2, 3, 4, 5, 6, 7, 8}. For example, in one particular embodiment, Equation 4 is satisfied and $N_{rot}$=2. As another example, in various embodiments in which the lowest bandwidth normal mode data units are 2 MHz data units generated using 64-point IDFTs, and in which the low bandwidth mode data units are 0.5 MHz data units that are generated using 16-point IDFTs and have 12 OFDM data tones, one of the following two options is implemented:

1) $N_{col}=6, N_{row}=2 \times N_{BPSCS}$      Equation 6

2) $N_{col}=4, N_{row}=3 \times N_{BPSCS}$      Equation 7 and $N_{rot}$ is one of [2, 3, 4, 5].

Corresponding to each spatial stream, a constellation mapper 162 maps an interleaved sequence of bits to constellation points corresponding to different subcarriers/tones of an OFDM symbol. The constellation mappers 162 are similar to constellation mappers 112 of FIG. 2, in an embodiment.

In addition to, or instead of, any MCS restrictions described above (e.g., low bandwidth mode data units only being permitted to use a lowest MCS, etc.), in various embodiments, the allowed MCSs for low bandwidth mode data units are MCSs that satisfy the following equations:

$N_{CBPS}/N_{ES}=m$      Equation 8

$N_{DBPS}/N_{ES}=n$      Equation 9

$\mod(N_{CBPS}/N_{ES}, D_R)=0$      Equation 10

$R=N_R/D_R$      Equation 11 where $N_{CBPS}$ is the number of coded bits per symbol, $N_{DBPS}$ is the number of uncoded bits per symbol, $N_{ES}$ is the number of BCC encoders, m and n are integers, R is the coding rate, and $D_R$ is the denominator of the coding rate (i.e., $D_R$=2 if R=½, $D_R$=3 if R=⅔, $D_R$=4 if R=¾, and $D_R$=5 if R=⅚). In an embodiment, $N_{ES}$ always equals one for low bandwidth mode data units (i.e., one spatial stream and one BCC encoder, are used in low bandwidth mode). In other embodiments, $N_{RS}$ is a suitable number greater than one for low bandwidth mode data units.

In an embodiment, an STBC unit 164 (e.g., similar to STBC unit 114 of FIG. 2) receives the constellation points corresponding to the one or more spatial streams and spreads the spatial streams to a number of space-time streams. A plurality of CSD units 166 (e.g., similar to CSD units 116 of FIG. 2) are coupled to the STBC unit 164, which in turn is coupled to a spatial mapping unit 170 (e.g., similar to the spatial mapping unit 120 of FIG. 2). Each output of the spatial mapping unit 170 corresponds to a transmit chain, and each output of the spatial mapping unit 120 is operated on by an IDFT unit 172. The IDFT units 172 are similar to the IDFT units 122 of FIG. 2 and use the same clock rate as the IDFT units 122, in an embodiment, but use a smaller size IDFT than any normal mode data units. For example, in one embodiment where normal mode data units are generated using 64-point or larger IDFTs, low bandwidth mode data units are generated using 32-point IDFTs. In an alternative embodiment in which normal mode data units are generated using 64-point or larger IDFTs, low bandwidth mode data units are generated using 16-point IDFTs. In another alternative embodiment in which normal mode data units are generated using 64-point or larger IDFTs, low bandwidth mode data units are generated using either a 16-point or 32-point IDFT depending on which of two PHY sub-modes within a low bandwidth mode is selected.

Outputs of the IDFT units 172 are provided to GI insertion and windowing units 174 (e.g., similar to GI insertion and windowing units 124 of FIG. 2), and outputs of the GI insertion and windowing units 172 are provided to analog and RF units 176 (e.g., similar to analog and RF units 126 of FIG. 2). In one embodiment, the generated low bandwidth mode data units are then transmitted in a low bandwidth mode frequency band. In one embodiment in which normal mode transmissions utilize 2 MHz and greater bandwidth (e.g., 4 MHz, 8 MHz, etc.) channels, the frequency band for low bandwidth mode transmissions is 1 MHz. In other such embodiments, 0.5 MHz or another suitable bandwidth less than the minimum normal mode channel bandwidth is utilized.

While the example PHY processing unit 150 of FIG. 3 includes multiple spatial streams (one for each interleaver 160 and constellation mapper 162), the low bandwidth mode utilizes only a single spatial stream in other embodiments. For example, the low bandwidth mode is restricted to an MCS (e.g., MCS0 described above) in which only one spatial stream is utilized. In some of these embodiments, the stream parser 158 is omitted or not utilized. Moreover, the STBC unit 164 and/or CSD units 166 are omitted in some embodiments. Further, in one embodiment where FEC encoder 154 is an LDPC encoder rather than a BCC encoder, interleavers 160 are omitted. In an embodiment, the same LDPC parity matrix and parameters used for normal mode are also used for low bandwidth mode, and a puncturing/shortening/padding procedure utilizes the values of $N_{CBPS}$ and $N_{DBPS}$ (number of coded data bits per symbol and uncoded data bits per symbol, respectively) that correspond to the low bandwidth mode. In some embodiments, padding procedures that are used in the low bandwidth mode correspond to any such procedures described in U.S. application Ser. No. 13/366,064, filed on Feb. 3, 2012 and entitled "Control Mode PHY for WLAN," the disclosure of which is hereby incorporated by reference herein in its entirety.

FIGS. 4 and 5 illustrate transmit portions of example PHY processing units for generating low bandwidth mode data units in embodiments that use repetition to decrease the data rate and increase receiver sensitivity. For ease of explanation, certain units are not shown in FIGS. 4 and 5 even though the units are in some embodiments included. For example, each of the PHY processing units includes a scrambler, in various embodiments, such that the information bits input into the transmit flows depicted in FIGS. 4 and 5 are scrambled bits. In some embodiments, the low bandwidth mode only uses the repetition of FIG. 4 or FIG. 5 with BPSK modulation and/or with a single space-time stream, and does not use repetition (e.g., as in the example PHY processing unit 150 of FIG. 3) otherwise.

FIG. 4 illustrates an embodiment in which an example PHY processing unit 200 generates low bandwidth mode data units utilizing repetition of BCC-encoded bits, prior to mapping the bits to constellation symbols. A BCC encoder 204 accepts information bits and outputs the BCC-encoded bits to a block encoder 206. The block encoder 206 provides bit-level repetition (e.g., [b1 b1, b2 b2, . . . ] for 2× repetition) or block-level repetition (e.g., [b1 . . . b12, b1 . . . b12, b13 . . . b24, b13 . . . b24, . . . ] for 2× repetition with block size 12), in various embodiments. In one example embodiment, 2× repetition (rate ½ block coding) is used. In another example embodiment, 4× repetition (rate ¼ block coding) is used. The block encoder 206 output couples to a bit flip unit 210 that changes the sign or polarity of select bits (e.g., every other bit) to reduce the peak-to-average power ratio (PAPR) of the generated OFDM signal. In some embodiments, the bit flip unit 210 is not included in the PHY processing unit 200.

The output of bit flip unit 210 (or of block encoder 206, if unit 210 is omitted) is coupled to BCC interleaver 212. The BCC interleaver 212 is similar to interleaver 160 of FIG. 3, in an embodiment. In some embodiments, the BCC interleaver 212 is not included in the PHY processing unit 200. The output of BCC interleaver 212 (or of bit flip unit 210 or block encoder 206, if BCC interleaver 212 is omitted) is coupled to constellation mapper 214. Constellation mapper 214 is similar to constellation mapper 112 of FIG. 2, in an embodiment. The constellation size utilized by constellation mapper 214 to generate low bandwidth mode data units is determined by the MCS mode, which in some embodiments is the lowest MCS (or an MCS lower than the lowest MCS) utilized for normal mode data units, as described above.

The output of the constellation mapper 214 is coupled to an IDFT unit 216. The IDFT unit 216 is similar to IDFT unit 172 of FIG. 3 (e.g., uses a 32-point or 16-point IDFT as compared to a 64-point or larger IDFT for normal mode data units), in an embodiment. The output of IDFT unit 216 is coupled to CSD unit 218, in some embodiments. In embodiments or scenarios in which the PHY processing unit 200 operates to generate low bandwidth mode data units for transmission via multiple transmit chains, the CSD unit 218 inserts a cyclic shift into all but one of the transmit chains to prevent unintentional beamforming. In other embodiments, CSD unit 218 is omitted. The output of CSD unit 218 (or of IDFT unit 216, if CSD unit 218 is omitted) is coupled to GI insertion and windowing unit 220, and the output of GI insertion and windowing unit 220 is coupled to analog and RF unit 222. In various embodiments and/or scenarios, the generated low bandwidth mode data units are then transmitted in a 1 MHz or a 0.5 MHz bandwidth channel (e.g., corresponding to a 32-point or 16-point IDFT at unit 216, respectively). In other embodiments, one or more other suitable channel bandwidths (corresponding to other IDFT sizes) that are less than the minimum normal mode channel bandwidth is/are utilized.

In a more specific example embodiment, where IDFT unit 216 uses a 32-point IDFT to generate OFDM symbols having 24 data tones for low bandwidth mode data units, the BCC encoder 204 is a rate ½ BCC encoder that received 6 information bits per OFDM symbol and outputs 12 bits per OFDM symbol, the block encoder 206 is a rate ½ (2× repetition) block encoder that output 24 bits per OFDM symbol using block-level repetition, the 24 output bits are interleaved using a regular BCC interleaver, and constellation mapping unit 214 utilizes a BPSK modulation technique.

In one alternative embodiment, block encoder 206 is earlier in the transmit flow of FIG. 4 than BCC encoder 204 (i.e., repetition of bits occurs prior to BCC encoding), and bit flip unit 210 is omitted. In another alternative embodiment, block encoder 206 is instead coupled to the output of constellation mapper 214 (i.e., for repetition of constellation points) and bit flip unit 210 is omitted. In some of these latter embodiments, a phase shift unit (not shown in FIG. 4) is coupled to the block encoder 206 output to reduce the PAPR of the OFDM signal, and the output of the phase shift unit is coupled to the IDFT unit 216. If the phase shift unit is not included in the embodiment, the output of block encoder 206 is instead coupled to IDFT unit 216. In various embodiments, the processing unit 200 is configured to utilize any of the repetition techniques described in U.S. application Ser. No. 13/366,064.

FIG. 5 is a block diagram of a transmit portion of another example PHY processing unit 350 for generating low bandwidth mode data units, according to an embodiment. Generally, the various units shown in FIG. 5 are similar to the like units in FIG. 4. Unlike the example embodiment of FIG. 4, however, a BCC encoder 352 coupled to the block encoder 354 additionally utilizes LDPC encoding, and a stream parser 356, STBC unit 360, and spatial mapping unit 362 are included in PHY processing unit 350 to support multiple spatial streams and space-time streams. Moreover, in addition to CSD units 364, a second set of CSD units 366 is utilized on each of the space-time streams after the STBC unit 360, in an embodiment. In an embodiment, the second set of CSD units 366 is applied only if more than one space-time stream is transmitted, in order to reduce unintended beamforming during the short training field (which is primarily used to set automatic gain control (AGC) gain at the receiver). In other embodiments, the CSD units 366 are omitted. Moreover, in some embodiments, the bit flip unit 370 and/or BCC interleavers 372 is/are omitted. Further, in some embodiments, the block encoder 354 and bit flip unit 370 are only applied when more than one space-time stream is being transmitted.

In a more specific example embodiment, where IDFT unit 374 uses a 32-point IDFT to generate OFDM symbols having 24 data tones for low bandwidth mode data units, the BCC/LDPC encoder 352 is a rate ½ BCC/LDPC encoder that outputs 12×$N_{SS}$ bits per OFDM symbol (where $N_{SS}$ is the number of spatial streams, the block encoder 354 is a rate ½ (2×repetition) block encoder that output 24×$N_{SS}$ bits per OFDM symbol using block-level repetition, and each constellation mapper 376 uses BPSK modulation.

In one alternative embodiment, bit repetition occurs after stream parser 356 (i.e., in each spatial stream) rather than before stream parser 356. For example, in an embodiment, the block encoder 354 and (if present) bit flip unit 370 are included in each spatial stream, coupled between stream parser 356 and the corresponding BCC interleaver 372. As in the embodiment where bit repetition occurs before stream parser 356, the bit repetition is applied on a bit-by-bit basis in some embodiments, and on a block level in other embodiments.

FIG. 6 is a diagram of example normal mode data units 600, 620 having different bandwidths, according to an embodiment. The normal mode data units 600, 620 are down-clocked versions of data units conforming to a short range protocol. For the particular embodiment shown in FIG. 6, the normal mode data units 600, 620 are down-clocked versions of IEEE 802.11n data units using the "Greenfield" (rather than mixed mode) preamble. In other embodiments, the normal mode data units 600, 620 are down-clocked versions of data units conforming to other short range protocols The normal mode data unit 600 corresponds to a lowest normal mode channel bandwidth (e.g., 2 MHz utilizing a 64-point IDFT), and includes a short training field (STF) 602, a first long training field (LTF1) 604-1, a signal (SIG) field 606, remaining LTFs 604-2 to 604N (e.g., one additional LTF per spatial stream), and a data (DATA) portion 608. Generally, the STF 602 is used for packet detection, initial synchronization, and automatic gain control, etc., the LTFs 604 are used for channel estimation and fine synchronization, and the SIG field 606 is used to carry certain physical layer (PHY) parameters of the data unit 600, such as signal bandwidth (e.g., 2 MHz for data unit 600), modulation type, and coding rate used to transmit the data unit, for example. In an embodiment, each of STF 602, LTF1 604-1, and SIG field 606 comprises two OFDM symbols, and each of the remaining LTFs 604-2 to 604-N comprises one OFDM symbol. In other embodiment, STF 602, LTF1 604-1, SIG field 606 and/or the remaining LTFs 604-2 to 604-N comprise other suitable numbers of OFDM symbols.

For higher bandwidth normal mode data units, the STF, LTFs, and SIG fields are duplicated in each of multiple sub-bands, each sub-band having a bandwidth equal to the lowest normal mode channel bandwidth. For example, where data unit 600 is the minimum-bandwidth normal mode data unit and has a 2 MHz bandwidth, data unit 620 duplicates the STF 622, LTFs 624, and SIG field 626 in each 2 MHz band as a preamble to the data portion 628, and the data portion 628 occupies the full (4 MHz) bandwidth without frequency duplication. A receiver detecting normal mode data unit 600 or 620 is able to determine the bandwidth of the data unit based on bandwidth information in SIG fields 606 and/or SIG fields 626, in an embodiment.

FIG. 7 is a diagram of an example multi-user data unit 700, according to an embodiment. In an embodiment, the AP 14 is configured to transmit the multi-user data unit 700 to multiple ones of the client stations 25. The multi-user data unit 700 includes an "omni" portion 702 which contains PHY information that is common to each intended recipient of the data unit 700 and a multi-user (MU) portion 722 which contains different information for different client stations 25 that are simultaneously transmitted, via the antennas 24, over different spatial channels to carry different (or "user-specific") content to each of the client stations 25. The omni portion 720 includes a short training field (STF) 702, a first long training field (LTF1) 704-1 and a field signal field (SIGA) 706. The MU portion 722 includes a multi-user short training field (MU-STF) 708, a plurality of multi-user long training fields (MU-LTFs) 710-1 to 710-N, a second signal (SIGB) field 712 and a data portion 714. In an embodiment, each of STF 702, LTF1 704, and SIGA field 706 comprises two OFDM symbols. On the other hand, each of the MU-LTFs 710-1 to 710-N and SIGB field 712 comprises only one OFDM symbol, in an embodiment. In other embodiment, STF 702, LTF1 704, and SIGA field 706, MU-LTFs 710-1 to 710-N and/or SIGB field 712 comprise other suitable numbers of OFDM symbols.

Figure 8:
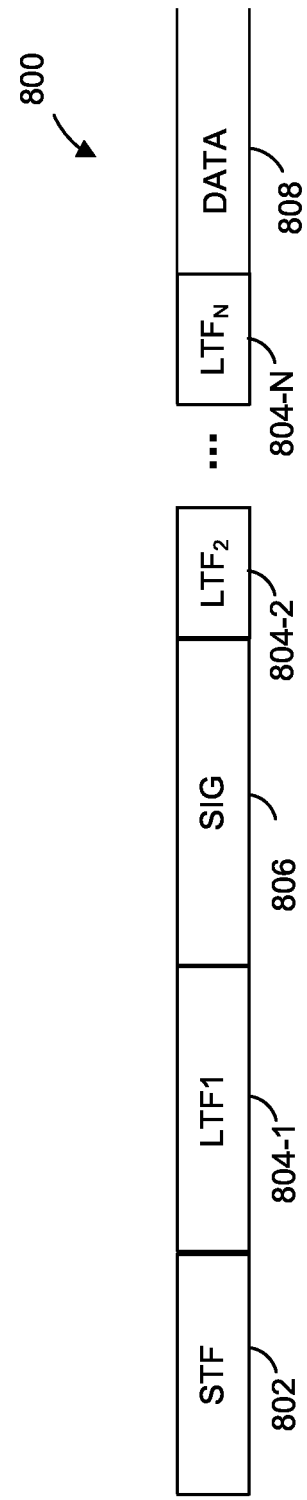
FIG. 8 is a diagram of a preamble of an example low bandwidth mode data unit, according to an embodiment.

FIG. 8 is a diagram of a preamble of an example low bandwidth mode data unit 800, according to an embodiment. The low bandwidth mode data unit 800 is generated using the same clock rate as the normal mode data units 600, 620, but utilizing a smaller size IDFT to reduce the bandwidth. For example, in one embodiment in which the normal mode data units 600 and 620 correspond to 2 MHz and 4 MHz bandwidths (generated using 64- and 128-point IDFTs), respectively, the low bandwidth mode data unit 800 has a 1 MHz bandwidth, and is generated using a 32-point IDFT. Similar to the normal mode data unit 600, the low bandwidth mode data unit 800 includes an STF 802, an LTF1 804-1, a SIG field 806, and remaining LTFs 802-2 to 804-N (e.g., one additional LTF per spatial stream, if more than one spatial stream is utilized for low bandwidth mode data units). In some embodiments, various fields of the low bandwidth data unit 800 are longer and comprise more OFDM symbols compared to the corresponding fields of the normal mode data unit 600. For example, each of STF 802 and LTF1 804-1 comprises four OFDM symbols, in an embodiment. In other embodiments, STF 802 and/or LTF1 804-1 comprises other suitable numbers of OFDM symbols. The length of the SIG field 806 is different in different embodiment. In one embodiment, the SIG field 806 comprises five OFDM symbols. In another embodiment, the SIG field 806 comprises six OFDM symbols. Generally, the SIG field 806 comprises any suitable number $N_{SIG}$ of OFDM symbols.

In various embodiments, each of one or more OFDM symbols of a normal mode data unit (e.g., data units 600, 620, 700) and/or each of one or more OFDM symbols of a low bandwidth mode data unit (e.g., data unit 800) includes one or several pilot tones generally used for carrier frequency offset, phase tracking, phase noise estimations, etc. In general, the one or several pilot tones within an OFDM symbols are modulated with known pilot tone values that allow a device receiving a data unit to perform phase tracking between the receiving device and the device that transmitted the data unit and/or to perform fine frequency tuning, in some embodiments. The particular number of pilot tones and the particular values used to modulate the pilot tones depend on various factors such as data unit bandwidth and/or data unit type, for example.

Referring to FIG. 6, according to an embodiment, the LTF fields 604, the SIG field 606 and the data portion 608 of the data unit 600 each includes one or more pilot tones. Similarly, the LTF fields 624, the SIG field 626 and the data portion 628 of the data unit 620 each includes one or more pilot tones, in an embodiment. Referring now to FIG. 7, in an embodiment, the LTF1 field 704, the SIGA field 706, MU-LTFs 710, SIGB field 712 and the data portion 714 of the data unit 700 each includes one or more pilot tones. With regard to the low bandwidth data unit 800 of FIG. 8, LTFs 804, SIG field 806 and the data portion 808 each includes one or more pilot tones, according to an embodiment. The particular locations of pilot tones within an OFDM symbol and the particular pilot tone values used to modulate the pilot tones within the OFDM symbol depend on various factors, such as the type of the data unit, the OFDM symbol index within the data unit, the bandwidth for which the OFDM symbol is generated, etc., as will be explained in more detail below, in at least some embodiments.

The number of pilot tones included in an OFDM symbol and sub-carrier locations reserved for the pilot tones within the OFDM symbol depends on the bandwidth of the OFDM symbol, in an embodiment. A 2 MHz OFDM symbol (i.e., an OFDM symbol generated for a portion of a data unit to be transmitted in a 2 MHz bandwidth channel), for example, includes four pilot tones at sub-carrier indices $\{\pm 7, \pm 21\}$, in an example embodiment. A 4 MHz OFDM symbol (i.e., an OFDM symbol generated for a portion of a data unit to be transmitted in a 4 MHz bandwidth channel) includes six pilot tones at sub-carrier locations indices $\{\pm 11, \pm 25, \pm 53\}$, in an embodiment. An 8 MHz OFDM symbol (i.e., an OFDM symbol generated for a portion of a data unit to be transmitted in an 8 MHz bandwidth channel) includes eight pilot tones at sub-carrier indices $\{\pm 103, \pm 75, \pm 39, \pm 11\}$, in an embodiment. In a 16 MHz OFDM symbol (i.e., an OFDM symbol generated for a portion of a data unit to be transmitted in an 16 MHz bandwidth channel), each 8 MHz sub-band includes pilot tones at locations specified above for an 8 MHz OFDM symbol, in an embodiment. Accordingly, in this embodiment, a 16 MHz OFDM symbol includes 16 pilot tones at sub-carrier indices $\{\pm 231, \pm 203, \pm 167, \pm 139, \pm 117, \pm 89, \pm 53, \pm 25\}$. A 1 MHz OFDM symbol generated for a low bandwidth data unit includes two pilot tones at sub-carrier indices $\{\pm 7\}$, in an embodiment. OFDM symbols for the various bandwidths include other suitable numbers of pilot tones and/or pilot tones at other suitable sub-carrier indices within the OFDM symbols, in other embodiments.

In an embodiment, pilot tones in an OFDM symbol, as seen at the transmit antennas 24 (or the transmit antennas 34), can be represented as:

$$[X_k(n)]_{N_{TX} \times 1} = [Q_k]_{N_{TX} \times N_{STS}} [D_{CSD}^{(k)}]_{N_{STS} \times N_{STS}}$$
$$[P_{*1}]_{N_{STS} \times 1} \cdot p_k(n) \qquad \text{Equation 12}$$

where k denotes a tone index, n denotes an OFDM symbol index, $N_{TX}$ is the number of transmit antennas used to transmit the OFDM symbol, $N_{STS}$ is the number of spatial or space tine streams over which the OFDM symbol is transmitted, Q is a spatial mapping matrix, $D_{CSD}^{(k)}$ is a diagonal matrix with diagonal elements representing cyclic shifts in the time domain for the $k^{th}$ tone, $P_{*1}$ is the first column of a P mapping matrix generally used to map log training fields to multiple spatial streams, $p_k(n)$ is a plot tone value for a $k^{th}$ sub-carrier and $n^{th}$ OFDM symbol. In this case, pilot tones generated according to Equation 12 are single stream pilot tones, mapped to multiple spatial streams using a single row (e.g., the first row) of a mapping matrix that is used to map long training fields (LTFs) to the multiple spatial streams. In at least some embodiments, pilot tones are transmitted as single stream pilot tones even when data tones in the same OFDM symbol are multi-stream data tones mapped to multiple spatial streams using a respective different vector for each spatial stream (e.g. different columns of the mapping matrix P), in an embodiment. Transmitting pilot tones as single stream tones allows receiving devices to utilize pilot tones (e.g., for phase tracking, frequency offset estimation, etc.) prior to having obtained a channel matrix for each of the spatial streams. Thus, in such embodiments, it is sufficient to determine a channel matrix for the first spatial stream, e.g., using the first long training sequence LTF1 in a data unit, to utilize pilot tones received in subsequent fields of the data unit.

With continued reference to Equation 12, the pilot tone values $p_k(n)$ for pilot tones in a particular OFDM symbol are determined using a first pilot mapping function or using a second pilot mapping function depending on the field or the portion of the data unit for which the OFDM symbol is being generated, in some embodiments and/or scenarios. For example, for a 2 MHz OFDM symbol generated for a signal field in a preamble of a normal mode data unit, pilot tone values are determined according to:

$$p_k(n) = p_n P_k \qquad \text{Equation 13}$$

where $p_n$ is a pilot tone polarity determined by a cyclic extension of the 127 element pseudo random sequence given by:

$$p_{0,126v} = \begin{Bmatrix} 1,1,1,1, & -1,-1,-1,1, & -1,-1,-1,-1, \\ 1,1,-1,1, & -1,-1,1,1, & -1,1,1,-1, \\ 1,1,1,1, & 1,1,-1,1, & 1,1,-1,1, \\ 1,-1,-1,1, & 1,1,-1,1, & -1,-1,-1,1, \\ -1,1,-1,-1, & 1,-1,-1,1, & 1,1,1,1, \\ -1,-1,1,1, & -1,-1,1,-1, & 1,-1,1,1, \\ -1,-1,-1,1, & 1,-1,-1,-1, & -1,1,-1,-1, \\ 1,-1,1,1, & 1,1,-1,1, & -1,1,-1,1, \\ -1,-1,-1,-1, & -1,1,-1,1, & 1,-1,1,-1, \\ 1,1,1,-1, & -1,1,-1,-1, & -1,1,1,1, \\ -1,-1,-1,-1, & -1,-1,-1 & \end{Bmatrix} \qquad \text{Equation 14}$$

and $P_k$ is a pilot mapping function given by:

$$P_{-26,26} = \{0,0,0,0,0,1,0,0,0,0,0,0,0,0,0,0,0,1,0,0,0,0,0,$$
$$0,0,0,0,0,0,0,0,0,1,0,0,0,0,0,0,0,0,0,0,0,-1,0,$$
$$0,0,0,0\} \qquad \text{Equation 15}$$

In this case, a pilot tone contribution value sequence produced by the pilot mapping function $P_k$ is independent of the OFDM symbol index. In other words, the pilot produces a same pilot tone contribution value sequence for each OFDM symbol for which the pilot mapping function is utilized, according to an embodiment. Other suitable pseudorandom sequences and/or other suitable pilot mapping functions independent of the symbol index are utilized for a portion (e.g., a signal field) of a data unit in other embodiments.

On the other hand, for a different portion of the data unit, for example for a data portion of the data unit, pilot tone values are determined using a pilot mapping function that produces a pilot tone contribution sequence for an OFDM symbol that depends on or is a function of OFDM symbol index corresponding to the OFDM symbol, in some embodiments. In such embodiments, pilot tone contribution sequence values for such OFDM symbols are determined using pilot mapping that is based on OFDM symbol index within the data unit. For example, in one embodiment, pilot tone contribution sequence values for such OFDM symbols are determined according to:

$$p_k(n) = p_{n+a} P_n^k \qquad \text{Equation 16}$$

where pilot tone polarity sequence $p_n$ is given by Equation 14, a is an integer that modifies indexing into the pilot tone value sequence $p_n$, and $P_n^k$ is a pilot mapping function that produces pilot tone values as a function of the tone index k and of the OFDM symbol index n. In an embodiment, the value of a depends on the number of indexed OFDM symbols that precede the first OFDM symbol for which Equation 16 is utilized (e.g., the number of OFDM symbols indexed in the Equation 13). For example, if Equation 13 is utilized to determine pilot tone values for OFDM symbols of a signal field of a data unit, and the signal field comprises two OFDM symbols, then the integer a=2. The pilot mapping function $P_n^k$ in Equation 16 is similar to the pilot mapping function $P_k$ of Equation 13, but the pilot mapping function $P_n^k$ is a function of OFDM symbol index n and typically produces different pilot tone contribution sequences for any two consecutive OFDM symbols, in an embodiment.

In some embodiments, the particular pilot mapping function used to determine pilot values for an OFDM symbol depends of the bandwidth of the data unit (or of the portion of the data unit) for which the OFDM symbol is being generated. For example, in an embodiment, the pilot mapping function $P_n^k$ for a 2 MHz OFDM symbol is given by:

$$p_n^{k=pilot} = [\psi_{n \bmod 4} \psi_{(n+1) \bmod 4} \psi_{(n+2) \bmod 4} \psi_{(n+3) \bmod 4}]$$

$$P_k^{k \notin pilot} = 0 \qquad \text{Equation 17}$$

TABLE 1

| $\Psi_0$ | $\Psi_1$ | $\Psi_2$ | $\Psi_3$ |
|---|---|---|---|
| 1 | 1 | 1 | −1 | where $\psi_m$ is given by:

Similarly, in an embodiment, for a 4 MHz OFDM symbol, the pilot mapping function $P_n^k$ in Equation 16 is given by:

$$P_n^{k=pilot} = [\psi_{n \bmod 6} \psi_{(n+1) \bmod 6} \psi_{(n+2) \bmod 6} \psi_{(n+3) \bmod 6} \psi_{(n+4) \bmod 6} \psi_{(n+5) \bmod 6}]$$

$$P_n^{k \notin pilot} = 0 \qquad \text{Equation 17}$$

where $\psi_m$ is given by:

TABLE 2

| $\Psi_0$ | $\Psi_1$ | $\Psi_2$ | $\Psi_3$ | $\Psi_4$ | $\Psi_5$ |
|---|---|---|---|---|---|
| 1 | 1 | 1 | −1 | −1 | 1 |

Further, according to an embodiment, for an 8 MHz OFDM symbol, the pilot mapping function $P_n^k$ in Equation 16 is given, in an embodiment, by:

$$P_n^{k=pilot} = [\psi_{n \bmod 8} \psi_{(n+1) \bmod 8} \cdots \psi_{(n+7) \bmod 8}]$$

$$P_n^{k \notin pilot} = 0 \qquad \text{Equation 18}$$

where $\psi_m$ is given by:

TABLE 3

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1 |

For a 16 MHz OFDM symbol, the pilot mapping function given by Equation 18 and Table 3 is utilized for each 8 MHz sub-band, in an embodiment.

Other suitable pilot mappings that are based on the OFDM symbol index are utilized for OFDM symbols of various bandwidths, in other embodiments.

In various embodiments, Equation 13 and Equation 16 are utilized, respectively, to determine pilot tone values for different portions of a normal mode data unit (e.g., the single user normal mode data units 600, 620 of FIG. 6, the multi-user normal mode data unit 700, another normal mode data unit, another suitable normal mode data unit, etc.). For example, Equation 13 is utilized to determine pilot values for OFDM symbols of the SIG field 606 of the data unit 600, and Equation 16 is utilized to determine pilot values for OFDM symbols of the data portion 608, in an embodiment. Because the data unit 600 is a 2 MHz data unit, and accordingly the data portion 608 comprises 2 MHz OFDM symbols, specific pilot contribution sequences for OFDM symbols of the data portion 608 are determined using Equation 17 and Table 1, in an embodiment. Similarly, in an embodiment, Equation 13 is utilized to determine pilot values for OFDM symbols of the SIG field 626, and Equation 16 is utilized to determine pilot values for OFDM symbols of the data portion 628. In this case, because the data unit 620 is a 4 MHz data unit, and accordingly the data portion 628 comprises 4 MHz OFDM symbols, specific pilot contribution sequences for OFDM symbols of the data portion 628 are determined using Equation 18 and Table 2, in an embodiment. For data portions of wider bandwidth data units, specific pilot contribution sequences for OFDM symbols are determined according to wider OFDM symbol pilot tone mappings (e.g., Equation 19 and Table 3 for an 8 MHz data unit).

In an embodiment, for a particular data unit, the OFDM symbol index n in Equations 13 and 16 is counted continuously over all OFDM symbols for which Equations 13 and 16 are utilized. For example, referring to the data unit 600 of FIG. 6, Equations 13 and 16 are utilized to determine pilot tone values for pilot tones in the SIG field 606 and the data portion 608, respectively, in an embodiment. In this embodiment, OFDM symbol index n begins with n=0 for the first OFDM symbol of the SIG field 606, and is counted continuously across the SIG field 606 and the data portion 608, skipping over OFDM symbols in the LTF fields 604-2 to 604-N. Thus, if the SIG field 606 comprises two OFDM symbols, then indices n=0,1 are utilized in Equation 13 for the first and second OFDM symbol, respectively, of the SIG field 606, in this embodiment. Further, in this embodiment, the index n=2 is utilized in Equation 16 for the first OFDM symbol of the data portion 608 of the data unit 600, the index n=3 is utilized in Equation 16 for the second OFDM symbol of the data portion 608 of the data unit 600, and so on.

Similarly, with continued reference to FIG. 6, OFDM symbol index n begins with n=0 for the first OFDM symbol of the SIG field 626, and is counted continuously across the SIG field 626 and the data portion 628 of the data unit 620, in an embodiment. Thus, if the SIG field 626 comprises two OFDM symbols, then indices n=0,1 are utilized in Equation 13 for the first and second OFDM symbol, respectively, of the SIG field 626, in this embodiment. Further, in this embodiment, the index n=2 is utilized in Equation 16 for the first OFDM symbol of the data portion 628 of the data unit 620, the index n=3 is utilized in Equation 16 for the second OFDM symbol of the data portion 628 of the data unit 620, and so on.

Referring now to FIG. 7, similar to the single user data units 600, 620 of FIG. 6, the OFDM symbol index n in Equations 13 and 16, when these equations are applied to the multi-user data unit 700, is counted continuously over all OFDM symbols for which the Equations 13 and 16 are utilized in the multi-user data unit 700, according to an embodiment. In an embodiment, OFDM symbol index n begins with n=0 for the first OFDM symbol of the SIGA field 706, and is counted continuously across the SIGA field 706, the SIGB field 712, and the data portion 714, skipping over MU-STF 708 and MU-LTFs 710. Accordingly, if the SIGA field 706 comprises two OFDM symbols, then n=0,1 is utilized in Equation 13 for the first and second OFDM symbol, respectively, of the SIG field 706, in this embodiment. Thus, in this embodiment, n=2 is utilized in Equation 16 for the first OFDM symbol of SIGB field 712. Further, if SIGB field 712 comprises one OFDM symbol, the OFDM symbol index n continues with n=3 for the first OFDM symbol of the data portion 714, n=4 is then utilized for the second OFDM symbol of the data portion 714, and so on.

Referring now to FIG. 8, each of one or more 1 MHz OFDM symbols of the low bandwidth mode data unit 800 includes two pilot tones at sub-carrier locations {±7}, as discussed above, in an embodiment. Pilot tone values for the two pilot tones in a 1 MHz OFDM symbol are determined, in some embodiments, according to:

$$p_k(n) = p_{n+\alpha} P_n^k \qquad \text{Equation 19}$$

where $p_n$ is the pilot tone value sequence given above in Equation 14, a is an integer that modifies indexing into the pilot tone value sequence $p_n$. In an embodiment, the integer a is equal to zero (a=0) for OFDM symbols of the SIG field 806, and is equal to $N_{SIG}$ (a=$N_{SIG}$) for OFDM symbols of the data portion 808. In an embodiment, the pilot mapping function $P_n^k$ in Equation 19 is utilized to determine pilot tone contribution sequence values for OFDM symbols of the SIG field 806 and of the data portion 808 of the data unit 800. Accordingly, pilot tone values for pilot tones in the SIG field 806, as well as pilot tone values for pilot tones in the data portion 808, are determined according to a jointly utilized pilot mapping function $P_n^k$, in such embodiments. In such embodiments, the pilot mapping function $P_n^k$ produces a pilot tone sequence for an OFDM symbol as a function of the OFDM symbol index n corresponding to the OFDM symbol for both the SIG field 806 and the data portion 808 of the data unit 800.

In some embodiments, however, pilot tones values for the two pilot tones of a 1 MHz OFDM symbol of the data unit 800 are determined according different pilot mapping functions for different portions of the data unit, in a similar manner as discussed above in regard to normal mode data units. For example, Equation 13 is utilized to determine pilot tone values for pilot tones in the SIG field 806, and Equation 16 is utilized to determine pilot tone values for pilot tones in the data portion 808, in one embodiment. In this embodiment, the pilot mapping function $P_n$ produces the same pilot tone contribution sequence for all OFDM symbols of the SIG field 806 (independent of the OFDM symbol index of a particular OFDM symbol), while the pilot mapping function $P_n^k$ used for the data portion 808 produces a pilot tone sequence for an OFDM symbol as a functions of the OFDM symbol index n corresponding to the OFDM symbol.

In any event, similar to the normal mode data units described above, OFDM symbol index n in Equations 13, 16, 19 is counted continuously over all OFDM symbols for which pilot tone mapping functions $P_k$ and/or $P_n^k$ are utilized in determining pilot tone values, in some embodiments. For example, with continued reference to FIG. 8, OFDM symbol index n begins with n=0 at the first OFDM symbol of the SIG field 806, in an embodiment. Further, the OFDM symbol index n is incremented by one for each consequent OFDM symbol of the SIG field 806, and then continues at the first OFDM symbol of the data portion 808, skipping over the OFDM symbols of the LTFs 804-2 to 804-N. Thus, for example, if the SIG field 806 comprises $N_{SIG}$ (e.g., $N_{SIG}$=5, 6, or another suitable number) OFDM symbols, then OFDM symbol indices n=0 to n=$N_{SIG}$−1 are utilized for the OFDM symbols of the SIG field 806, and symbol indices n=$N_{SIG}$, n=$N_{SIG}$+1, n=$N_{SIG}$+2, and so on are utilized for OFDM symbols of the data portion 808, in an embodiment. In another example embodiment, OFDM symbol index n=0 is utilized for the first OFDM symbol of the data portion 808, OFDM symbol index n=1 is utilized for the second OFDM symbol of the data portion 808, and so on. In this embodiment, OFDM symbol index for the first OFDM symbol of the SIG field 806 is, therefore, n=−$N_{SIG}$, and OFDM symbol index for the last OFDM symbol of the SIG field 806 is n=−1.

The particular pilot contribution sequences produced by the pilot mapping function $P_n^k$ for low bandwidth data units (e.g., in Equation 19, Equation 13 and/or Equation 16) is selected to reduce or minimize the peak-to-average power ratio (PAPR) of the generated OFDM signal, in some embodiment. For example, in one embodiment, the pilot mapping function $P_n^k$ produces alternating $P_n^k$={1,−1} and $P_n^k$={−1,1} for consecutively indexed OFDM symbols. For example, for n=0, the pilot mapping function $P_n^k$ produces the sequence $P_0^k$={1,−1}, for n=1, the pilot mapping function $P_n^k$ produces the sequence $P_1^k$={−1,1}, for n=2, the pilot mapping function $P_n^k$ produces the sequence $P_2^k$={1,−1}, and so on, in an embodiment. In other embodiments, other suitable pilot contribution sequences that produce a suitably low PAPR are utilized.

In another embodiment, the pilot mapping function $P_n$ and/or the pilot mapping function $P_n^k$ for low bandwidth data units utilize values of the corresponding sub-carrier indices in the pilot contribution sequences $P_n$ and $P_n^k$, respectively, utilized for the lowest bandwidth normal mode data units. For example, the pilot mapping function P and/or the pilot mapping function $P_n^k$ utilizes values described above at sub-carrier indices {±7} of a 2 MHz OFDM symbol, in some embodiments. In other embodiments, other suitable values based on normal mode data unit pilot contribution sequences are utilized for low bandwidth data units, for example values corresponding to any two pilot tones of any (not necessarily the lowest normal mode bandwidth) OFDM symbol pilot contribution sequences defined for normal mode data units.

FIG. 9 is a flow diagram of an example method 900 for generating a data unit, according to an embodiment. With reference to FIG. 1, the method 900 is implemented by the network interface 16, in an embodiment. For example, in one such embodiment, the PHY processing unit 20 is configured to implement the method 900. According to another embodiment, the MAC processing 18 is also configured to implement at least a part of the method 900. With continued reference to FIG. 1, in yet another embodiment, the method 900 is implemented by the network interface 27 (e.g., the PHY processing unit 29 and/or the MAC processing unit 28). In other embodiments, the method 900 is implemented by other suitable network interfaces.

At block 902, pilot tone contribution sequence values are determined, using a pilot mapping function, for a first set of OFDM symbols. The first set of OFDM symbols is to be included on a signal field of the data unit. Referring to FIG. 8, as an example, the first set of OFDM pilot tones is to be included in the SIG field 806 of the data unit 800, in an embodiment. At block 904, pilot tone contribution sequence values are determined for a second set of OFDM symbols. The second set of OFDM symbols is to be included in a data portion of the data unit. Continuing with the example data unit 800 of FIG. 8, in an embodiment, the second set of OFDM symbols is to be included in the data portion 808 of the data unit 800. Pilot tone contribution sequence values for the second set of OFDM symbols are determined using the same pilot mapping function that was used to determine pilot tone values for the first set of OFDM symbols at block 902, in an embodiment. As an example, pilot tone values at blocks 902, 904 are determined according to Equation 19 and, according, using the pilot mapping function $P_n^k$ of Equation 19, in an embodiment. In other embodiment, other suitable pilot mapping functions are utilized.

At block 906, the first set of OFDM symbols is generated to include pilot tones modulated according to the pilot tone contribution sequence values determined for the first set of OFDM symbols at block 902. At block 908, the second set of OFDM symbols is generated to include pilot tones modulated according to the pilot tone contribution sequence values determined for the second set of OFDM symbols at block 904.

At block 910 the signal field is generated to include the first set of OFDM symbols generated at block 906. Referring to FIG. 8, the SIG field 806 of the data unit 800 is generated, in one embodiment. In other embodiments other suitable signal fields and/or signal fields of other suitable data units are generated to include the first set of OFDM symbols generated at block 906. At block 912, the data portion is generated to include the second set of OFDM symbols generated at block 908. Referring again to FIG. 8, the data portion 808 of the data unit 800 is generated, in one embodiment. In other embodiments data portions if other suitable data units are generated to include the second set of OFDM symbols generated at block 908. At block 912, the data unit is generated to include at least the signal field generated at block 910 and the data portion generated at block 912. In an embodiment, the data unit 800 of FIG. 8 is generated. In other embodiments, other suitable data units are generated.

In an embodiment, a method for generating a physical layer (PHY) data unit for transmission via a communication channel includes determining, using a pilot mapping function, pilot tone contribution sequence values for a first set of orthogonal frequency division multiplexing (OFDM) symbols, the first set of OFDM symbols to be included in a signal field of the data unit. The method also includes determining, using the pilot mapping function, pilot tone contribution sequence values for a second set of OFDM symbols, the second set of OFDM symbols to be included in a data portion of the data unit. The method further includes generating the first set of OFDM symbols to include pilot tones modulated based on the pilot tone contribution sequence values determined for the first set of OFDM symbols, and generating the second set of OFDM symbols to include pilot tones modulated based on the pilot tone contribution sequence values determined for the second set of OFDM symbols. The method further still includes generating the signal field to include the first set of OFDM symbols, and generating the data portion include the second set of OFDM symbols. The method additionally includes generating the data unit to include at least the signal field and the data portion.

In other embodiments, the method includes any combination of one or more of the following elements.

Determining pilot tone contribution sequence values for an OFDM symbol is based at least in part on an OFDM symbol index corresponding to the OFDM symbol.

Generating the first set of OFDM symbols comprises generating at least a first OFDM symbol and a second OFDM symbol.

Pilot tone contribution sequence values determined for the first OFDM symbol are different than the corresponding pilot tone contribution values determined for the second OFDM symbol.

Each OFDM symbol in the first set of OFDM symbols includes two pilot tones, and each OFDM symbol in the second set of OFDM symbols includes two pilot tones.

Determining pilot tone contribution sequence values according to the pilot mapping function comprises selecting (a) $\{1,-1\}$ or (b) $\{-1, 1\}$, wherein a different one of (a) and (b) is selected for consecutively indexed OFDM symbols.

Generating the data unit further comprises including a plurality of long training fields in the data unit, mapping the plurality of long training fields to the plurality of spatial streams using a mapping matrix, mapping pilot tones in the first set of OFDM symbols to the plurality of spatial streams using a column of the mapping matrix, wherein the column of the mapping matrix used to map pilot tones to the multiple spatial streams is the first column of the mapping matrix; and mapping pilot tones in the second set of OFDM symbols to the plurality of spatial streams using the column of the mapping matrix.

The data unit is a first data unit and the pilot tone contribution sequence is a first pilot tone contribution sequence.

The method further comprises determining, using a second pilot mapping function, pilot tone contribution sequence values for a third set OFDM symbols, the third set of OFDM symbols to be included in a signal field of a second data unit.

The method further comprises determining, using a third pilot mapping function, pilot tone values for a fourth set of OFDM symbols, the fourth set of OFDM symbols to be included in a data portion of the second data unit, wherein the third pilot mapping function is different than the second pilot mapping function.

The method further comprises generating the third set of OFDM symbols to include pilot tones modulated based on the pilot tone contribution sequence values determined for the third set of OFDM symbols.

The method further comprises generating the fourth set of OFDM symbols to include pilot tones modulated based on the pilot tone contribution sequence values determined for the fourth set of OFDM symbols.

The method further comprises generating the signal field of the second data unit to include the third set of OFDM symbols, generating the data portion of the second data unit to include the fourth set of OFDM symbols, and generating the second data unit to include at least the signal field of the second data unit and the data portion of the second data unit.

The first data unit is a low bandwidth mode data unit to be transmitted in a low bandwidth mode, and the second data unit is a normal mode data unit to be transmitted in a normal mode.

Generating the third set of OFDM symbols comprises generating at least a third OFDM symbol and a fourth OFDM symbol Pilot tone contribution sequence values determined for the third OFDM symbol are the same as corresponding pilot tone contribution sequence values determined for the second OFDM symbol.

Determining pilot tone contribution sequence values for an OFDM symbol according to the third pilot mapping function is based at least in part on an OFDM symbol index corresponding to the OFDM symbol.

In another embodiment, an apparatus comprises a network interface configured to determine, using a pilot mapping function, pilot tone contribution sequence values for a first set of orthogonal frequency division multiplexing (OFDM) symbols, the first set of OFDM symbols to be included in a signal field of the data unit. The network interface is also configured to determine, using the pilot mapping function, pilot tone contribution sequence values for a second set of OFDM symbols, the second set of OFDM symbols to be included in a data portion of the data unit. The network interface is further configured to generate the first set of OFDM symbols to include pilot tones modulated based on the pilot tone contribution sequence values determined for the first set of OFDM symbols, and generate the second set of OFDM symbols to include pilot tones modulated based on pilot tone contribution sequence values determined for the second set of OFDM symbols. The network interface is further still configured to generate the signal field to include the first set of OFDM symbols, and generate the data portion include the second set of OFDM symbols. The network interface is additionally configured to generate the data unit to include at least the signal field and the data portion.

In other embodiments, the apparatus includes any combination of one or more of the following elements.

The network interface is configured to determine pilot tone contribution sequence values for an OFDM symbol based at least in part on an OFDM symbol index corresponding to the OFDM symbol.

The network interface is configured to generate the first set of OFDM symbols at least by generating at least a first OFDM symbol and a second OFDM symbol.

At least some of the pilot tone contribution sequence values determined for the first OFDM symbol are different than corresponding pilot tone contribution values determined for the second OFDM symbol.

Each OFDM symbol in the first set of OFDM symbols includes two pilot tones, and each OFDM symbol in the second set of OFDM symbols includes two pilot tones.

The network interface is configured to determine pilot tone contribution sequence values according to the pilot mapping function at least by selecting (a) $\{1,-1\}$ or (b) $\{-1,1\}$, wherein a different one of (a) and (b) is selected for consecutively indexed OFDM symbols.

The network interface is further configured to include a plurality of long training fields in the data unit, map the plurality of long training fields to the plurality of spatial streams using a mapping matrix, map pilot tones in the first set of OFDM symbols to the plurality of spatial streams using a column of the mapping matrix, wherein the column of the mapping matrix used to map pilot tones to the multiple spatial streams is the first column of the mapping matrix, and map pilot tones in the second set of OFDM symbols to the plurality of spatial streams using the column of the mapping matrix.

The data unit is a first data unit and the pilot tone contribution sequence is a first pilot tone contribution sequence.

The network interface is further configured to determine, using a second pilot mapping function, pilot tone contribution sequence values for a third set OFDM symbols, the third set of OFDM symbols to be included in a signal field of a second data unit.

The network interface is further configured to determine, using a third pilot mapping function, pilot tone values for a fourth set of OFDM symbols, the fourth set of OFDM symbols to be included in a data portion of the second data unit, wherein the third pilot mapping function is different than the second pilot mapping function.

The network interface is further configured to generate the third set of OFDM symbols to include pilot tones modulated based on the pilot tone contribution sequence values determined for the third set of OFDM symbols.

The network interface is further configured to generate the fourth set of OFDM symbols to include pilot tones modulated based on the pilot tone contribution sequence values determined for the fourth set of OFDM symbols.

The network interface is further configured to generate the signal field of the second data unit to include the third set of OFDM symbols, generate the data portion of the second data unit to include the fourth set of OFDM symbols, and generate the second data unit to include at least the signal field of the second data unit and the data portion of the second data unit.

The first data unit is a low bandwidth mode data unit to be transmitted in a low bandwidth mode, and the second data unit is a normal mode data unit to be transmitted in a normal mode.

The network interface is configured to generate the third set of OFDM symbols at least by generating at least a third OFDM symbol and a fourth OFDM symbol.

Pilot tone contribution sequence values determined for the third OFDM symbol are the same as corresponding pilot tone contribution sequence values determined for the fourth OFDM symbol.

Determining pilot tone values for an OFDM symbol according to the fourth mapping function is based at least in part on an OFDM symbol index corresponding to the OFDM symbol.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method for generating a physical layer (PHY) data unit for transmission via a communication channel, the method comprising:
   determining, using a pilot mapping function, pilot tone contribution sequence values for a first set of orthogonal frequency division multiplexing (OFDM) symbols, the first set of OFDM symbols to be included in a signal field of the data unit;
   determining, using the pilot mapping function, pilot tone contribution sequence values for a second set of OFDM symbols, the second set of OFDM symbols to be included in a data portion of the data unit;
   generating the first set of OFDM symbols to include pilot tones modulated based on the pilot tone contribution sequence values determined for the first set of OFDM symbols;
   generating the second set of OFDM symbols to include pilot tones modulated based on the pilot tone contribution sequence values determined for the second set of OFDM symbols;

generating the signal field to include the first set of OFDM symbols;
generating the data portion include the second set of OFDM symbols;
generating a plurality of training fields to be included in the data unit;
mapping the plurality of training fields to a plurality of spatial streams using a mapping matrix;
mapping the pilot tones in the first set of OFDM symbols to the plurality of spatial streams using a column of the mapping matrix, wherein the column of the mapping matrix used to map pilot tones to the multiple spatial streams is the first column of the mapping matrix;
mapping the pilot tones in the second set of OFDM symbols to the plurality of spatial streams using the column of the mapping matrix; and
generating the data unit to include at least (i) the signal field, (ii) the data portion, and (iii) a set of one or more training fields, of the plurality of training fields, between the signal field and the data portion.

2. The method according to claim 1, wherein determining pilot tone contribution sequence values for an OFDM symbol is based at least in part on an OFDM symbol index corresponding to the OFDM symbol.

3. The method according to claim 1, wherein generating the first set of OFDM symbols comprises generating at least a first OFDM symbol and a second OFDM symbol, and wherein pilot tone contribution sequence values determined for the first OFDM symbol are different than the corresponding pilot tone contribution values determined for the second OFDM symbol.

4. The method according to claim 1, wherein:
each OFDM symbol in the first set of OFDM symbols includes two pilot tones, and
each OFDM symbol in the second set of OFDM symbols includes two pilot tones.

5. The method according to claim 4, wherein determining pilot tone contribution sequence values according to the pilot mapping function comprises selecting (a) {1,−1} or (b) {−1, 1}, wherein a different one of (a) and (b) is selected for consecutively indexed OFDM symbols.

6. The method according to claim 1, wherein the data unit is a first data unit and the pilot tone contribution sequence is a first pilot tone contribution sequence, the method further comprising:
determining, using a second pilot mapping function, pilot tone contribution sequence values for a third set OFDM symbols, the third set of OFDM symbols to be included in a signal field of a second data unit;
determining, using a third pilot mapping function, pilot tone values for a fourth set of OFDM symbols, the fourth set of OFDM symbols to be included in a data portion of the second data unit, wherein the third pilot mapping function is different than the second pilot mapping function;
generating the third set of OFDM symbols to include pilot tones modulated based on the pilot tone contribution sequence values determined for the third set of OFDM symbols;
generating the fourth set of OFDM symbols to include pilot tones modulated based on the pilot tone contribution sequence values determined for the fourth set of OFDM symbols;
generating the signal field of the second data unit to include the third set of OFDM symbols;
generating the data portion of the second data unit to include the fourth set of OFDM symbols; and
generating the second data unit to include at least the signal field of the second data unit and the data portion of the second data unit.

7. The method according to claim 6, wherein:
the first data unit is a low bandwidth mode data unit to be transmitted in a low bandwidth mode; and
the second data unit is a normal mode data unit to be transmitted in a normal mode.

8. The method according to claim 6, wherein generating the third set of OFDM symbols comprises generating at least a third OFDM symbol and a fourth OFDM symbol, and wherein pilot tone contribution sequence values determined for the third OFDM symbol are the same as corresponding pilot tone contribution sequence values determined for the second OFDM symbol.

9. The method according to claim 6, wherein determining pilot tone contribution sequence values for an OFDM symbol according to the third pilot mapping function is based at least in part on an OFDM symbol index corresponding to the OFDM symbol.

10. An apparatus, comprising:
a network interface device having one or more integrated circuits configured to
determine, using a pilot mapping function, pilot tone contribution sequence values for a first set of orthogonal frequency division multiplexing (OFDM) symbols, the first set of OFDM symbols to be included in a signal field of the data unit,
determine, using the pilot mapping function, pilot tone contribution sequence values for a second set of OFDM symbols, the second set of OFDM symbols to be included in a data portion of the data unit,
generate the first set of OFDM symbols to include pilot tones modulated based on the pilot tone contribution sequence values determined for the first set of OFDM symbols,
generate the second set of OFDM symbols to include pilot tones modulated based on pilot tone contribution sequence values determined for the second set of OFDM symbols,
generate the signal field to include the first set of OFDM symbols,
generate the data portion include the second set of OFDM symbols,
generate a plurality of training fields to be included in the data unit,
map the plurality of training fields to a plurality of spatial streams using a mapping matrix,
map the pilot tones in the first set of OFDM symbols to the plurality of spatial streams using a column of the mapping matrix, wherein the column of the mapping matrix used to map pilot tones to the multiple spatial streams is the first column of the mapping matrix,
map the pilot tones in the second set of OFDM symbols to the plurality of spatial streams using the column of the mapping matrix, and
generate the data unit to include at least (i) the signal field, (ii) the data portion, and (iii) a set of one or more training fields, of the plurality of training fields, between the signal field and the data portion.

11. The apparatus according to claim 10, wherein the one or more integrated circuits are configured to determine pilot tone contribution sequence values for an OFDM symbol based at least in part on an OFDM symbol index corresponding to the OFDM symbol.

12. The apparatus according to claim 10, wherein the one or more integrated circuits are configured to generate the first set of OFDM symbols at least by generating at least a first OFDM symbol and a second OFDM symbol, and wherein at least some of the pilot tone contribution sequence values determined for the first OFDM symbol are different than corresponding pilot tone contribution values determined for the second OFDM symbol.

13. The apparatus according to claim 10, wherein:
each OFDM symbol in the first set of OFDM symbols includes two pilot tones, and
each OFDM symbol in the second set of OFDM symbols includes two pilot tones.

14. The apparatus according to claim 13, wherein the one or more integrated circuits are configured to determine pilot tone contribution sequence values according to the pilot mapping function at least by selecting (a) {1,−1} or (b) {−1,1}, wherein a different one of (a) and (b) is selected for consecutively indexed OFDM symbols.

15. The apparatus according to claim 13, wherein the data unit is a first data unit and the pilot tone contribution sequence is a first pilot tone contribution sequence, and wherein the one or more integrated circuits are further configured to:
determine, using a second pilot mapping function, pilot tone contribution sequence values for a third set OFDM symbols, the third set of OFDM symbols to be included in a signal field of a second data unit;
determine, using a third pilot mapping function, pilot tone values for a fourth set of OFDM symbols, the fourth set of OFDM symbols to be included in a data portion of the second data unit, wherein the third pilot mapping function is different than the second pilot mapping function;
generate the third set of OFDM symbols to include pilot tones modulated based on the pilot tone contribution sequence values determined for the third set of OFDM symbols;
generate the fourth set of OFDM symbols to include pilot tones modulated based on the pilot tone contribution sequence values determined for the fourth set of OFDM symbols;
generate the signal field of the second data unit to include the third set of OFDM symbols;
generate the data portion of the second data unit to include the fourth set of OFDM symbols; and
generate the second data unit to include at least the signal field of the second data unit and the data portion of the second data unit.

16. The apparatus according to claim 15, wherein:
the first data unit is a low bandwidth mode data unit to be transmitted in a low bandwidth mode; and
the second data unit is a normal mode data unit to be transmitted in a normal mode.

17. The apparatus according to claim 15, wherein the one or more integrated circuits are configured to generate the third set of OFDM symbols at least by generating at least a third OFDM symbol and a fourth OFDM symbol, and wherein pilot tone contribution sequence values determined for the third OFDM symbol are the same as corresponding pilot tone contribution sequence values determined for the fourth OFDM symbol.

18. The apparatus according to claim 15, wherein determining pilot tone values for an OFDM symbol according to the fourth mapping function is based at least in part on an OFDM symbol index corresponding to the OFDM symbol.

* * * * *